US012260751B2

(12) United States Patent
Zhou

(10) Patent No.: US 12,260,751 B2
(45) Date of Patent: Mar. 25, 2025

(54) ROAD INFORMATION DETECTION METHOD AND APPARATUS

(71) Applicant: Shenzhen Yinwang Intelligent Technologies Co., Ltd., Shenzhen (CN)

(72) Inventor: Wei Zhou, Shanghai (CN)

(73) Assignee: SHENZHEN YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 368 days.

(21) Appl. No.: 17/827,170

(22) Filed: May 27, 2022

(65) Prior Publication Data
US 2022/0292849 A1 Sep. 15, 2022

Related U.S. Application Data

(63) Continuation of application No. PCT/CN2020/108133, filed on Aug. 10, 2020.

(30) Foreign Application Priority Data

Nov. 30, 2019 (CN) .......................... 201911209196.4

(51) Int. Cl.
G06V 20/56 (2022.01)
B60W 60/00 (2020.01)
(Continued)

(52) U.S. Cl.
CPC ............. G08G 1/04 (2013.01); B60W 60/001 (2020.02); G06F 18/25 (2023.01); G06V 20/588 (2022.01);
(Continued)

(58) Field of Classification Search
CPC ...... B60W 50/16; B60W 40/04; B60W 40/02; B60W 60/0015; B60W 30/09;
(Continued)

(56) References Cited

U.S. PATENT DOCUMENTS

2004/0164851 A1 8/2004 Crawshaw
2012/0062747 A1* 3/2012 Zeng .................... G06V 20/588
348/149

(Continued)

FOREIGN PATENT DOCUMENTS

CN 8102398598 A 4/2012
CN 104751151 A 7/2015
(Continued)

OTHER PUBLICATIONS

Wen Shaobo, et al., "New energy vehicles and their intelligent technology," FD, ISBN: 9787564173838, 2017, with an English abstract, 7 pages.

Primary Examiner — Phuoc H Doan
(74) Attorney, Agent, or Firm — Conley Rose, P.C.

(57) ABSTRACT

A road information detection method is applied to automatic driving or intelligent driving and includes receiving a front-looking image from at least one front-looking camera apparatus; receiving a rear-looking image from at least one rear-looking camera apparatus; obtaining front-looking lane line information based on the front-looking image; obtaining rear-looking lane line information based on the rear-looking image; and obtaining target lane line information based on the front-looking lane line information and the rear-looking lane line information.

20 Claims, 6 Drawing Sheets

(51) Int. Cl.
*G06F 18/25* (2023.01)
*G08G 1/04* (2006.01)

(52) U.S. Cl.
CPC ... *B60W 2420/403* (2013.01); *B60W 2552/53* (2020.02)

(58) Field of Classification Search
CPC .............. G06V 20/588; G06K 9/6288; G06K 9/00791; B60Q 9/008; B60K 35/00; G07C 5/008
See application file for complete search history.

(56) References Cited

U.S. PATENT DOCUMENTS

| | | |
|---|---|---|
| 2014/0032108 A1 | 1/2014 | Zeng et al. |
| 2014/0211014 A1 | 7/2014 | Kawasaki et al. |
| 2018/0173970 A1 | 6/2018 | Bayer et al. |

FOREIGN PATENT DOCUMENTS

| | | |
|---|---|---|
| CN | 107646114 A | 1/2018 |
| CN | 107862290 A | 3/2018 |
| CN | 108162867 A | 6/2018 |
| CN | 110286671 A | 9/2019 |
| CN | 110334634 A | 10/2019 |
| CN | 110516652 A | 11/2019 |
| EP | 2279889 B1 | 9/2015 |

\* cited by examiner

ROAD INFORMATION DETECTION METHOD AND APPARATUS

CROSS-REFERENCE TO RELATED APPLICATIONS

This application is a continuation application of International Patent Application No. PCT/CN2020/108133, filed on Aug. 10, 2020, which claims priority to Chinese Patent Application No. 201911209196.4, filed on Nov. 30, 2019. The disclosures of the aforementioned applications are hereby incorporated by reference in their entireties.

TECHNICAL FIELD

Embodiments of this application relate to the information processing field, and in particular, to a road information detection method and a road information detection apparatus.

BACKGROUND

In an assisted driving scenario and an automatic driving scenario, an intelligent vehicle needs to be aware of a driving environment in a traveling process of the vehicle. Road information detection is an important function of the intelligent vehicle to identify a surrounding environment, and is also an important part of environment perception. Only through effective and accurate road information detection can auxiliary functions such as path planning, road deviation alarm, or lane line maintenance be better supported.

In a conventional technology, a vehicle analyzes an image obtained by a front-looking camera apparatus, to obtain lane line information, or analyzes an image obtained by a rear-looking camera apparatus, to obtain lane line information, and an intelligent vehicle performs road information detection based on the lane line information. The image obtained by the front-looking camera apparatus and the image obtained by the rear-looking camera apparatus are mutually redundancy backups.

Road information detection is directly performed on lane line information obtained by analyzing an image corresponding to one camera apparatus such as the front-looking camera apparatus, and consequently, reliability of road information is not high, and stability of a road information detection result is not high.

SUMMARY

Embodiments of this application provide a road information detection method, so that a plurality of groups of lane line information may be fused to obtain target lane line information.

A first aspect of embodiments of this application provides a road information detection method.

A road information detection apparatus receives a plurality of pieces of image information, such as a front-looking image and a rear-looking image, where the front-looking image is obtained by a front-looking camera apparatus, and the rear-looking image is obtained by a rear-looking camera apparatus; the road information detection apparatus obtains front-looking lane line information based on the front-looking image, and obtains rear-looking lane line information based on the rear-looking image; and the road information detection apparatus performs fusion based on the obtained front-looking lane line information and the obtained rear-looking lane line information, to obtain target lane line information. Further optionally, the road information detection apparatus outputs the target lane line information.

Images corresponding to a plurality of camera apparatuses such as the front-looking camera apparatus and the rear-looking camera apparatus are separately analyzed to obtain a plurality of groups of lane line information, and the plurality of groups of lane line information are fused to obtain the target lane line information, so that reliability of the target lane line information is relatively high, and stability of a road information detection result is relatively high.

Based on the first aspect of embodiments of this application, in a first implementation of the first aspect of embodiments of this application, if the front-looking lane line information includes information such as a correspondence between a horizontal offset and a longitudinal offset of a front-looking lane line in a traveling process of a vehicle and a probability that the front-looking lane line exists, and the rear-looking lane line information includes information such as a correspondence between a horizontal offset and a longitudinal offset of a rear-looking lane line in the traveling process of the vehicle and a probability that the rear-looking lane line exists, the road information detection apparatus may fuse the correspondence between the horizontal offset and the longitudinal offset of the front-looking lane line, the probability that the front-looking lane line exists, the correspondence between the horizontal offset and the longitudinal offset of the rear-looking lane line, the probability that the rear-looking lane line exists, to obtain the target lane line information. The target lane line information may be a correspondence between a horizontal offset and a longitudinal offset of a target lane line.

In this embodiment of this application, specific information included in the front-looking lane line information and the rear-looking lane line information is provided, and a specific form of the target lane line information is provided, so that this solution is more implementable.

Based on the first aspect of embodiments of this application, in a second implementation of the first aspect of embodiments of this application, the road information detection apparatus may alternatively obtain front-looking lane structure information based on the front-looking image, and obtain rear-looking lane structure information based on the rear-looking image, and if the road information detection apparatus obtains the front-looking lane structure information based on the front-looking image, and obtains the rear-looking lane structure information based on the rear-looking image, the road information detection apparatus may fuse the front-looking lane line information, the rear-looking lane line information, the front-looking lane structure information, and the rear-looking lane structure information, to obtain the target lane line information.

In this embodiment of this application, the road information detection apparatus may alternatively obtain the front-looking lane structure information based on the front-looking image, and obtain the rear-looking lane structure information based on the rear-looking image. The target lane line information obtained with reference to the front-looking lane structure information and the rear-looking lane structure information is more stable.

Based on the second implementation of the first aspect of embodiments of this application, in a third implementation of the first aspect of embodiments of this application, the front-looking lane line information may include information such as a correspondence between a horizontal offset and a longitudinal offset of a front-looking lane line in a traveling process of a vehicle and a probability that the front-looking lane line exists, the rear-looking lane line information may include information such as a correspondence between a horizontal offset and a longitudinal offset of a rear-looking lane line in the traveling process of the vehicle and a probability that the rear-looking lane line exists, the front-looking lane structure information may include information such as a correspondence between a horizontal offset and a longitudinal offset of a front-looking lane structure in the traveling process of the vehicle and a probability that the front-looking lane structure exists, and the rear-looking lane structure information may include information such as a correspondence between a horizontal offset and a longitudinal offset of a rear-looking lane structure in the traveling process of the vehicle and a probability that the rear-looking lane structure exists; and the road information detection apparatus fuses the correspondence between the horizontal offset and the longitudinal offset of the front-looking lane line, the probability that the front-looking lane line exists, the correspondence between the horizontal offset and the longitudinal offset of the rear-looking lane line, the probability that the rear-looking lane line exists, the correspondence between the horizontal offset and the longitudinal offset of the front-looking lane structure, the probability that the front-looking lane structure exists, the correspondence between the horizontal offset and the longitudinal offset of the rear-looking lane structure, and the probability that the rear-looking lane structure exists, to obtain a correspondence between a horizontal offset and a longitudinal offset of a target lane line.

In this embodiment of this application, specific information included in the front-looking lane line information, the rear-looking lane line information, the front-looking lane structure information, and the rear-looking lane structure information is provided, and a specific form of the target lane line information is provided, so that this solution is more implementable.

Based on the first aspect of embodiments of this application, in a fourth implementation of the first aspect of embodiments of this application, the road information detection apparatus may receive radar data, where the radar data is obtained by a millimeter-wave radar; the road information detection apparatus obtains radar lane structure information based on the radar data; and if the road information detection apparatus receives the radar data and obtains the radar lane structure information by analyzing the radar data, the road information detection apparatus may fuse the front-looking lane line information, the rear-looking lane line information, and the radar lane structure information, to obtain the target lane line information.

In this embodiment of this application, the road information detection apparatus may alternatively receive the radar data, and obtain the radar lane structure information based on the radar data. The target lane line information obtained with reference to the radar lane structure information is more stable.

Based on the fourth implementation of the first aspect of embodiments of this application, in a fifth implementation of the first aspect of embodiments of this application, the front-looking lane line information may include information such as a correspondence between a horizontal offset and a longitudinal offset of a front-looking lane line in a traveling process of a vehicle and a probability that the front-looking lane line exists, the rear-looking lane line information may include information such as a correspondence between a horizontal offset and a longitudinal offset of a rear-looking lane line in the traveling process of the vehicle and a probability that the rear-looking lane line exists, and the radar lane structure information may include information such as a correspondence between a horizontal offset and a longitudinal offset of a radar lane structure in the traveling process of the vehicle and a probability that the radar lane structure exists; and the road information detection apparatus may fuse the correspondence between the horizontal offset and the longitudinal offset of the front-looking lane line, the probability that the front-looking lane line exists, the correspondence between the horizontal offset and the longitudinal offset of the rear-looking lane line, the probability that the rear-looking lane line exists, the correspondence between the horizontal offset and the longitudinal offset of the radar lane structure, and the probability that the radar lane structure exists, to obtain a correspondence between a horizontal offset and a longitudinal offset of a target lane line.

In this embodiment of this application, specific information included in the front-looking lane line information, the rear-looking lane line information, and the radar lane structure information is provided, and a specific form of the target lane line information is provided, so that this solution is more implementable.

Based on the first aspect of embodiments of this application, in a sixth implementation of the first aspect of embodiments of this application, the road information detection apparatus may further receive radar data in addition to the front-looking image and the rear-looking image, and the road information detection apparatus obtains the front-looking lane line information and front-looking lane structure information based on the front-looking image, obtains the rear-looking lane line information and rear-looking lane structure information based on the rear-looking image, and obtains radar lane structure information based on the radar data. In a condition of this implementation, the road information detection apparatus may fuse the front-looking lane line information, the rear-looking lane line information, the front-looking lane structure information, the rear-looking lane structure information, and the radar lane structure information, to obtain the target lane line information.

In this embodiment of this application, the road information detection apparatus may alternatively obtain the front-looking lane structure information based on the front-looking image, and obtain the rear-looking lane structure information based on the rear-looking image. The target lane line information obtained with reference to the front-looking lane structure information and the rear-looking lane structure information is more stable.

Based on the sixth implementation of the first aspect of embodiments of this application, in a seventh implementation of the first aspect of embodiments of this application, the front-looking lane line information may include information such as a correspondence between a horizontal offset and a longitudinal offset of a front-looking lane line in a traveling process of a vehicle and a probability that the front-looking lane line exists, the rear-looking lane line information may include information such as a correspondence between a horizontal offset and a longitudinal offset of a rear-looking lane line in the traveling process of the vehicle and a probability that the rear-looking lane line exists, the front-looking lane structure information may include information such as a correspondence between a horizontal offset and a longitudinal offset of a front-looking lane structure in the traveling process of the vehicle and a probability that the front-looking lane structure exists, the rear-looking lane structure information may include information such as a correspondence between a horizontal offset and a longitudinal offset of a rear-looking lane structure in the traveling process of the vehicle and a probability that the rear-looking lane structure exists, and the radar lane structure information may include information such as a correspondence between a horizontal offset and a longitudinal offset of a radar lane structure in the traveling process of the vehicle and a probability that the radar lane structure exists; and the road information detection apparatus may fuse the correspondence between the horizontal offset and the longitudinal offset of the front-looking lane line, the probability that the front-looking lane line exists, the correspondence between the horizontal offset and the longitudinal offset of the rear-looking lane line, the probability that the rear-looking lane line exists, the correspondence between the horizontal offset and the longitudinal offset of the front-looking lane structure, the probability that the front-looking lane structure exists, the correspondence between the horizontal offset and the longitudinal offset of the rear-looking lane structure, the probability that the rear-looking lane structure exists, the correspondence between a horizontal offset and a longitudinal offset of a radar lane structure, and the probability that the radar lane structure exists, to obtain a correspondence between a horizontal offset and a longitudinal offset of a target lane line.

In this embodiment of this application, specific information included in the front-looking lane line information, the rear-looking lane line information, the front-looking lane structure information, the rear-looking lane structure information, and the radar lane structure information is provided, and a specific form of the target lane line information is provided, so that this solution is more implementable.

Based on the third implementation of the first aspect of embodiments of this application and the seventh implementation of the first aspect, in an eighth implementation of the first aspect of embodiments of this application, the front-looking lane structure information may be front-looking road edge information and/or front-looking vehicle track information; the correspondence between the horizontal offset and the longitudinal offset of the front-looking lane structure may be a correspondence between a horizontal offset and a longitudinal offset of a front-looking road edge and/or a correspondence between a horizontal offset and a longitudinal offset of a front-looking vehicle track; the probability that the front-looking lane structure exists may be a probability that the front-looking road edge exists and/or a probability that the front-looking vehicle track exists; the rear-looking lane line information may be rear-looking road edge information; the correspondence between the horizontal offset and the longitudinal offset of the rear-looking lane structure may be a correspondence between a horizontal offset and a longitudinal offset of a rear-looking road edge; and the probability that the rear-looking lane structure exists may be a probability that the rear-looking road edge exists.

In this embodiment of this application, specific information content of the front-looking lane structure information and the rear-looking lane structure information is provided, so that this solution is more implementable.

Based on the fifth implementation of the first aspect of embodiments of this application and the seventh implementation of the first aspect, in a ninth implementation of the first aspect of embodiments of this application, the radar lane structure information may be radar road edge information and/or radar vehicle track information; the correspondence between the horizontal offset and the longitudinal offset of the radar lane structure may be a correspondence between a horizontal offset and a longitudinal offset of a radar road edge and/or a correspondence between a horizontal offset and a longitudinal offset of a radar vehicle track; and the probability that the radar lane structure exists may be a probability that the radar road edge exists and/or a probability that the radar vehicle track exists.

In this embodiment of this application, specific information content of the radar lane structure information is provided, so that this solution is more implementable.

A second aspect of embodiments of this application provides a road information detection apparatus, and the apparatus performs the method in the first aspect.

A third aspect of embodiments of this application provides a road information detection apparatus, and the apparatus performs the method in the first aspect.

A fourth aspect of embodiments of this application provides a computer storage medium. The computer storage medium stores instructions. When the instructions are executed on a computer, the computer is enabled to perform the method in the first aspect.

A fifth aspect of embodiments of this application provides a computer program product. When the computer program product is run on a computer, the computer is enabled to perform the method in the first aspect.

DESCRIPTION OF EMBODIMENTS

Embodiments of this application provide a road information detection method and a road information detection apparatus, to obtain more reliable lane line information.

The following clearly describes the technical solutions in embodiments of this application with reference to the accompanying drawings in embodiments of this application. It is clear that the described embodiments are merely some but not all of embodiments of this application.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in appropriate circumstances, so that embodiments described herein can be implemented in an order other than the content illustrated or described herein. In addition, terms such as "include", "have", and any variations thereof are intended to cover non-exclusive inclusion, for example, a process, method, system, product, or device that includes a series of steps or units is not necessarily limited to those expressly listed steps or units, but may include other steps or units that are not expressly listed or inherent to such a process, method, product, or device.

Figure 1:
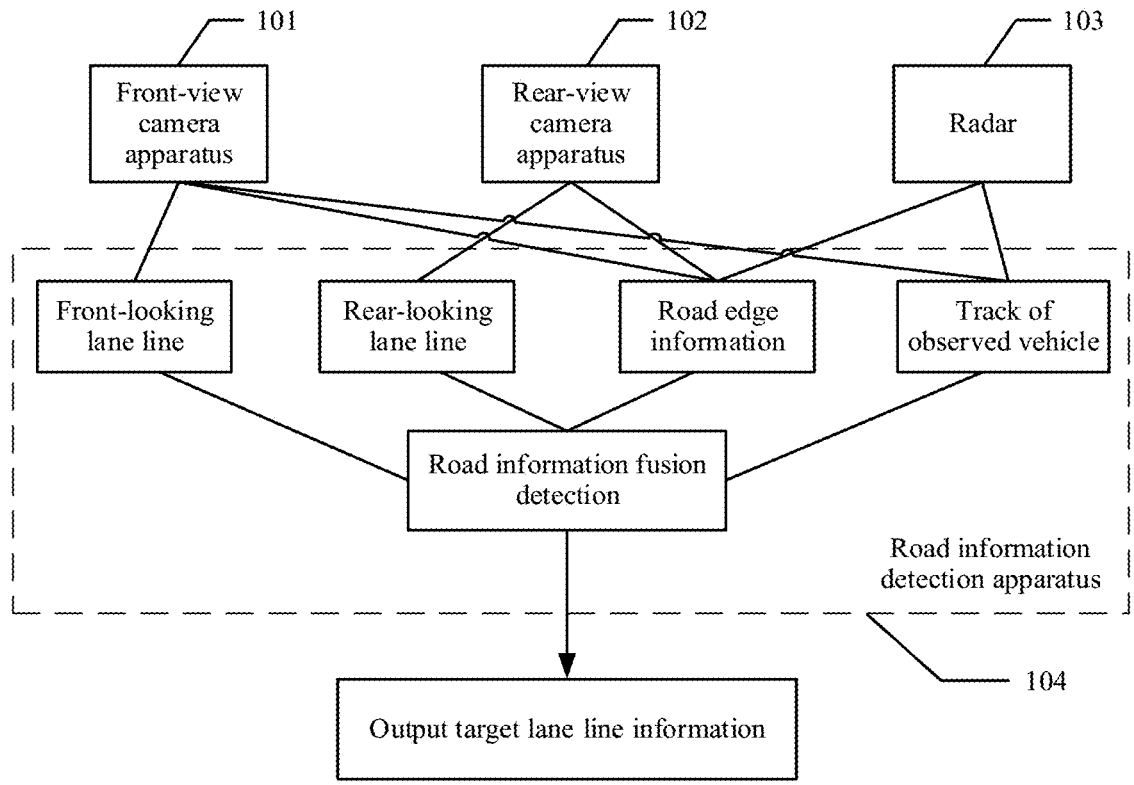
FIG. 1 is a schematic diagram of a framework of a road information detection apparatus.

Refer to FIG. 1, a framework of a road information detection system in an embodiment of this application includes: a front-looking camera apparatus 101, a rear-looking camera apparatus 102, a radar 103, and a road information detection apparatus 104. Optionally, the radar may be a millimeter-wave radar or a laser radar.

In this embodiment of this application, the road information detection apparatus 104 is applied to an intelligent vehicle, and sensors of the intelligent vehicle include the front-looking camera apparatus 101 and the rear-looking camera apparatus 102. The road information detection apparatus 104 is separately connected to the front-looking camera apparatus 101 and the rear-looking camera apparatus 102. The front-looking camera apparatus 101 photographs road information to obtain a front-looking image, and transmits the front-looking image to the road information detection apparatus 104. The rear-looking camera apparatus 102 photographs road information to obtain a rear-looking image, and transmits the rear-looking image to the road information detection apparatus 104.

In addition to the front-looking camera apparatus 101 and the rear-looking camera apparatus 102, the sensors of the intelligent vehicle may further include another sensor such as the radar 103. The road information detection apparatus 104 is connected to the radar 103, and the radar 103 detects road information to obtain radar data, and transmits the radar data to the road information detection apparatus 104.

A main function of the road information detection apparatus 104 is to receive data transmitted by the sensor, separately analyze and process different sensor data to obtain corresponding road information, fuse obtained plurality of pieces of road information to obtain target lane line information, and output the target lane line information.

The road information detection apparatus 104 receives the front-looking image sent by the front-looking camera apparatus 101 in the sensors, and road information obtained by analyzing the front-looking image may include road information such as front-looking lane line information and/or front-looking lane structure information. The front-looking lane structure information may include front-looking lane structure information such as front-looking road edge information and/or front-looking vehicle track information.

The road information detection apparatus 104 receives the rear-looking image sent by the rear-looking camera apparatus 102 in the sensors, and road information obtained by analyzing the rear-looking image may include road information such as rear-looking lane line information and/or rear-looking lane structure information. The rear-looking lane structure information may include but is not limited to rear-looking road edge information.

The road information detection apparatus 104 receives the radar data sent by the radar 103 in the sensors, and road information obtained by analyzing the radar data may include radar lane structure information. The radar lane structure information may include radar lane structure information such as radar road edge information and/or radar vehicle track information.

In this embodiment of this application, the road information detection apparatus 104 obtains, by using a technology such as an image detection technology or a visual recognition technology, the front-looking image photographed by the front-looking camera apparatus 101 and the rear-looking image photographed by the rear-looking camera apparatus 102, to obtain road information. An obtaining technology is not limited herein. The road information detection apparatus 104 obtains, by using a method such as a clustering algorithm or Hough transform, radar data detected by the millimeter-wave radar, to obtain road information. An obtaining technology is not limited herein.

Figure 2:
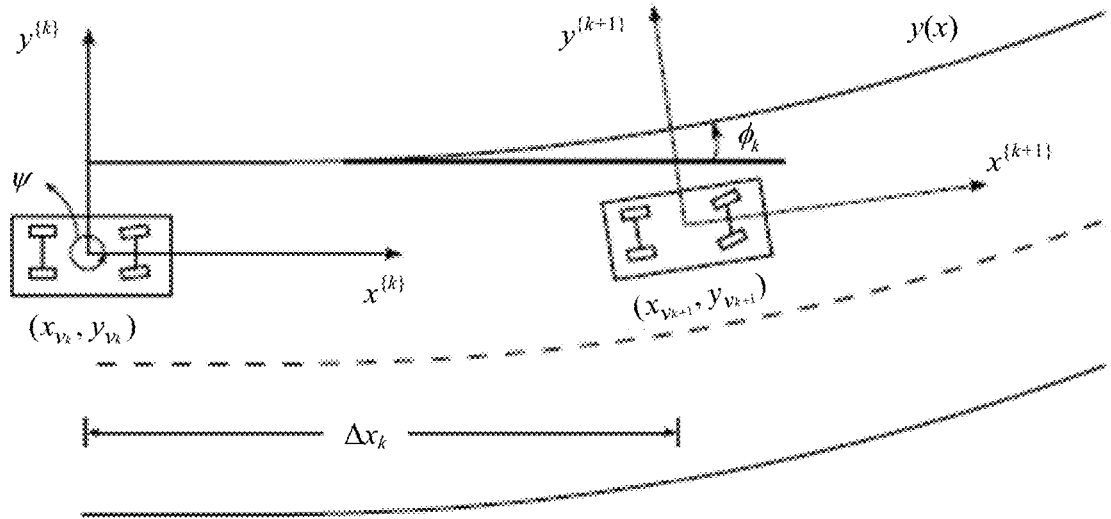
FIG. 2 is a schematic diagram of a road structure model according to an embodiment of this application.

Refer to a road structure model shown in FIG. 2, the following describes a road structure model in embodiments of this application.

A road information detection apparatus may obtain a road structure model based on at least one of road information parameters such as an average curvature change rate of a road edge, average curvature of a road edge, a heading angle of a road edge, and a horizontal offset of a road edge. An optional formula representation method for the road structure model is provided below. However, this application is not limited thereto, and the road structure model may be determined or indicated by at least one of the foregoing parameters.

In an optional design, the road structure model is generally represented by a clothoid. A correspondence between a horizontal offset and a longitudinal offset of the road structure model may be represented as:

$$y(1) = A0 + A1\mathbf{1} + \frac{1}{2}A2\mathbf{1}^2 + \frac{1}{6}A3\mathbf{1}^3.$$

It may be learned from the foregoing correspondence that, in a traveling process, a relationship between a horizontal offset of a vehicle and an arc length 1 of traveling of the vehicle is that a longitudinal offset of the vehicle is a sum of a third power of 1 multiplied by one sixth of A3, a second power of 1 multiplied by half of A2, 1 multiplied by A1, and A0, where A0 is a horizontal offset of a road edge, A1 is a heading angle of the road edge, A2 is average curvature of the road edge, and A3 is an average curvature change rate of the road edge.

It should be noted that a basic assumption of using a clothoid model is that a heading angle of the vehicle needs to be less than 10 degrees. Therefore, a sine value of the heading angle of the vehicle is approximately the heading angle of the vehicle, and a cosine value is approximately 1.

It is assumed that a change of curvature C of this curve with the arc length 1 is a constant; in other words, the average curvature change rate of the road edge is approximately a constant A3.

In this case, the curvature C may be represented as a linear function of the arc length 1: $C(1)=A2+A3\mathbf{1}$.

The heading angle $\phi(1)$ of the vehicle is an integral of the curvature on the arc length 1:

$$\phi(1) = \phi_0 + \int_0^1 C(1)d1 = \phi_0 + A2\mathbf{1} + \frac{1}{2}A3\mathbf{1}^2 = A1 + A2\mathbf{1} + \frac{1}{2}A3\mathbf{1}^2.$$

A rectangular coordinate system is established by using a head direction of the vehicle as a positive direction of an x-axis, and the vehicle is located at (x0, y0) at an initial moment. When the vehicle travels by the arc length 1, the following may be obtained:

$$x(1) = x_0 + \int_0^1 \cos\phi(1)d1; \text{ and } y(1) = y_0 + \int_0^1 \sin\phi(1)d1.$$

If x is 0 at the initial moment, that is, x0 is 0, curve coordinates that meet the assumption that the heading angle φ is less than 10 degrees may be represented as follows:

$$x(1); \text{ and } y(1) = y_0 + \int_0^1 \phi(1)d1.$$

Therefore, an expression of the clothoid may be obtained:

$$y(1) = A0 + A11 + \frac{1}{2}A21^2 + \frac{1}{6}A31^3 + A0 + A1x + \frac{1}{2}A2x^2 + \frac{1}{6}A3x^3.$$

For subsequent brief description, a constant is simplified to obtain the following:

$$y(x)C0+C1x+C2x^2+C3x^3.$$

C0 is the horizontal offset of the road edge, C1 is the heading angle of the road edge, C2 is twice the average curvature of the road edge, and C3 is six times the average curvature change rate of the road edge.

In this embodiment of this application, the road information detection apparatus may fuse a plurality of pieces of road information to obtain target lane line information. Separate descriptions are provided below with reference to a framework of a road information detection apparatus and a road structure model.

1. The road information detection apparatus fuses front-looking lane line information and rear-looking lane line information, to obtain the target lane line information.

Figure 3:
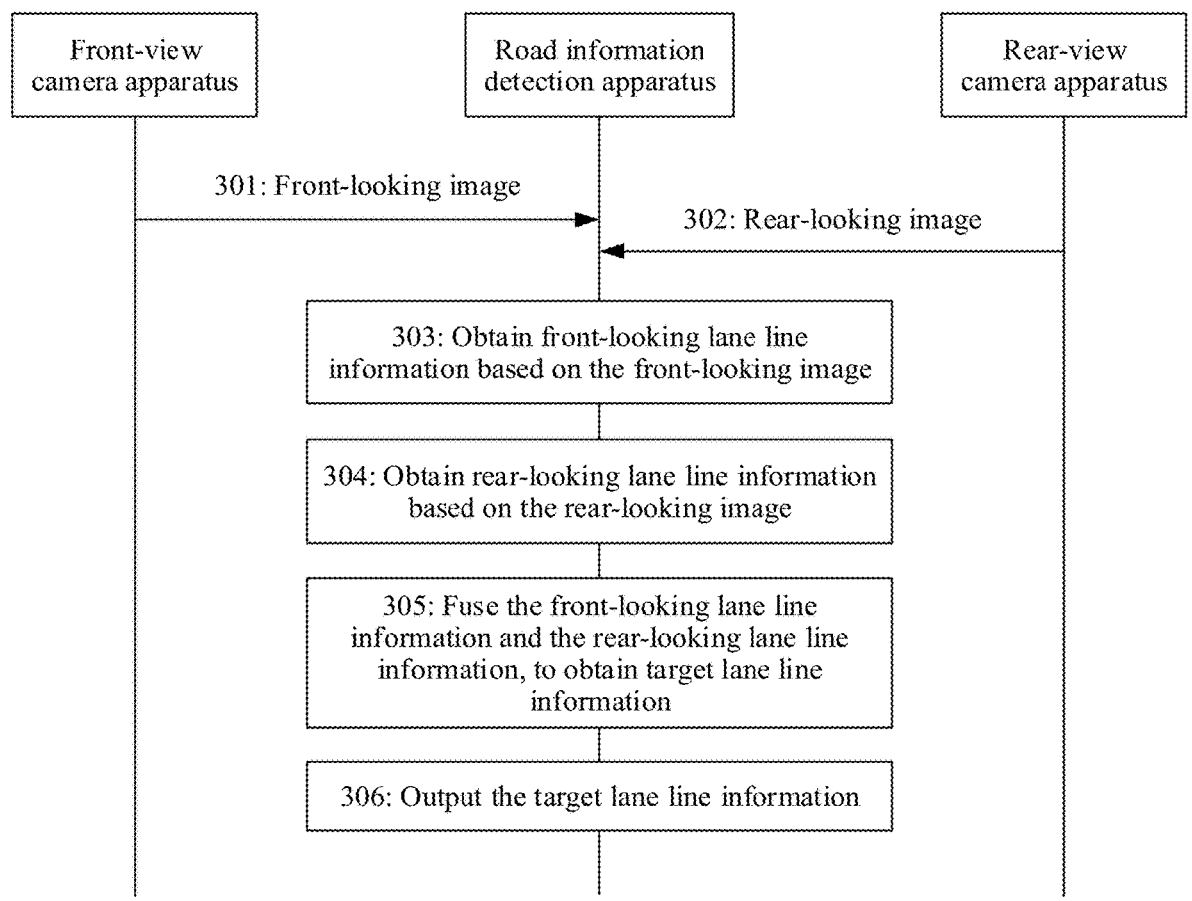
FIG. 3 is a schematic diagram of an embodiment of a road information detection method according to an embodiment of this application.

Refer to FIG. 3, an embodiment of a road information detection method in an embodiment of this application includes the following steps:

301: A road information detection apparatus receives a front-looking image.

The road information detection apparatus is connected to a front-looking camera apparatus. The connection may be a wired connection or a wireless connection, and this is not limited herein. If the connection is a wired connection, the road information detection apparatus may receive, by using a data transmission line, a front-looking image photographed by the front-looking camera apparatus. If the connection is a wireless connection, the road information detection apparatus may receive, by using a wireless network, a front-looking image photographed by the front-looking camera apparatus. The wireless network may be a public network wireless network or a dedicated network wireless network, and this is not limited herein.

302: The road information detection apparatus receives a rear-looking image.

The road information detection apparatus is connected to a rear-looking camera apparatus. The connection may be a wired connection or a wireless connection, and this is not limited herein. If the connection is a wired connection, the road information detection apparatus may receive, by using a data transmission line, a rear-looking image photographed by the rear-looking camera apparatus. If the connection is a wireless connection, the road information detection apparatus may receive, by using a wireless network, a rear-looking image photographed by the rear-looking camera apparatus. The wireless network may be a public network wireless network or a dedicated network wireless network, and this is not limited herein.

303: The road information detection apparatus obtains front-looking lane line information based on the front-looking image.

The road information detection apparatus analyzes the front-looking image by using a technology such as an image detection technology or a visual recognition technology, to obtain the front-looking lane line information. A technology is not limited herein.

304: The road information detection apparatus obtains rear-looking lane line information based on the rear-looking image.

The road information detection apparatus analyzes the rear-looking image by using a technology such as an image detection technology or a visual recognition technology, to obtain the rear-looking lane line information. A technology is not limited herein.

In this embodiment, a process in which the road information detection apparatus obtains the front-looking lane line information by using the front-looking image is described in steps 301 and 303, and a process in which the road information detection apparatus obtains the rear-looking lane line information by using the rear-looking image is described in steps 302 and 304. There is no fixed time sequence relationship between the two processes.

305: The road information detection apparatus fuses the front-looking lane line information and the rear-looking lane line information, to obtain target lane line information.

Information obtained by using the front-looking image is referred to as front-looking information, such as the front-looking lane line information, and information obtained by using the rear-looking image is referred to as rear-looking information, such as the rear-looking lane line information. The road information detection apparatus may obtain lane line information based on an image obtained by a camera apparatus, such as a correspondence between a horizontal offset and a longitudinal offset of a lane line that changes with traveling of a vehicle and a probability that the lane line exists, and may further obtain information such as a width of a lane, a type of the lane line such as a one-way line or a deceleration line, color of the lane line such as yellow or white, and a width of the lane line by using the front-looking image.

In this embodiment, the front-looking lane line information may include at least one of a correspondence between a horizontal offset and a longitudinal offset of a front-looking lane line in a traveling process of the vehicle, a probability that the front-looking lane line exists, a width of a front-looking lane, a type of the front-looking lane line, color of the front-looking lane line, and/or a width of the front-looking lane line.

The rear-looking lane line information may include at least one of a correspondence between a horizontal offset and a longitudinal offset of a rear-looking lane line in the traveling process of the vehicle, a probability that the rear-looking lane line exists, a width of a rear-looking lane, a type of the rear-looking lane line, color of the rear-looking lane line, and/or a width of the rear-looking lane line.

In this embodiment, detailed descriptions are provided by using an example in which the front-looking lane line information is the correspondence between the horizontal offset and the longitudinal offset of the front-looking lane line and the probability that the front-looking lane line exists, and an example in which the rear-looking lane line information is the correspondence between the horizontal offset and the longitudinal offset of the rear-looking lane line and the probability that the rear-looking lane line exists.

Based on image information collected by the front-looking camera apparatus, the front-looking lane line is detected based on a road structure model by using a method such as image detection or deep learning, and corresponding lane line information is obtained. The lane line may be represented by using a curve of a specific road structure model. Different lane line representations may include a horizontal offset of a lane edge, a heading angle of the lane edge, average curvature of the lane line, and an average curvature change rate of the lane line. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the front-looking lane line may be represented as follows:

$$X_{front,lane} = C3_{front,lane} \times Z^3 + C2_{front,lane} \times Z^2 + C1_{front,lane} \times Z + C0_{front,lane}.$$

In this embodiment of this application, $C0_{front,\ lane}$ is a horizontal offset of a road edge of the front-looking lane line, $C1_{front,\ lane}$ is front-looking a heading angle of the road edge of the lane line, $C2_{front,\ lane}$ is twice average curvature of the road edge of the front-looking lane line, $C3_{front,\ lane}$ is six times an average curvature change rate of the road edge of the front-looking lane line, $X_{front,\ lane}$ is front-looking a horizontal offset of the vehicle on the lane line, and Z is a longitudinal offset of the vehicle.

In addition, the probability that the front-looking lane line exists may be further obtained through detection, and is represented as $P_{front,\ lane}$. The probability that the front-looking lane line exists is used to indicate a probability that the lane line exists in the front-looking image.

Based on image information collected by the rear-looking camera apparatus, the rear-looking lane line is detected based on a road structure model by using a method such as image detection or deep learning, and corresponding lane line information is obtained. The lane line may be represented by using a curve of a specific road structure model and a correspondence between a horizontal offset and a longitudinal offset. Different lane line representations may include a horizontal offset of a lane edge, a heading angle of the lane edge, average curvature of the lane line, and an average curvature change rate of the lane line. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the rear-looking lane line may be represented as follows:

$$X_{rear,lane} = C3_{rear,lane} \times Z^3 + C2_{rear,lane} \times Z^2 + C1_{rear,lane} \times Z + C0_{rear,lane}$$

In this embodiment of this application, $C0_{rear,\ lane}$ is a horizontal offset of a road edge of the rear-looking lane line, $C1_{rear,\ lane}$ is a heading angle of the road edge of the rear-looking lane line, $C2_{rear,\ lane}$ is twice average curvature of the road edge of the rear-looking lane line, $C3_{rear,\ lane}$ is six times an average curvature change rate of the road edge of the rear-looking lane line, $X_{rear,\ lane}$ is a horizontal offset of the vehicle on the rear-looking lane line, and Z is a longitudinal offset of the vehicle.

In addition, the probability that the rear-looking lane line exists may be further obtained through detection, and is represented as $P_{rear,\ lane}$. The probability that the rear-looking lane line exists is used to indicate a probability that the lane line exists in the rear-looking image.

In this embodiment, the foregoing correspondence is merely used as an example for description. It may be understood that in actual application, a correspondence may have another form, for example, an equivalent variant of the foregoing correspondence between a horizontal offset and a longitudinal offset in the traveling process of the vehicle. This is not limited herein.

In this embodiment, the road information detection apparatus may fuse the front-looking lane line information and the rear-looking lane line information by using at least one of a plurality of fusion algorithms, to obtain the target lane line information. The fusion algorithm may be a Bayesian fusion algorithm, or may be another fusion algorithm such as a multi-hypothesis check algorithm. In this embodiment, a probability-based fusion algorithm is used as an example for a description.

In an optional design, a correspondence between a horizontal offset and a longitudinal offset of a target lane line obtained after fusion may be represented as follows:

$$X_{fusion} = C3_{fusion} \times Z^3 + C2_{fusion} \times Z^2 + C1_{fusion} \times Z + C0_{fusion},$$

where a probability that a lane line exists is fusion $P_{fusion}$, $x_{fusion}$ is a horizontal offset of the vehicle obtained after fusion, and Z is a longitudinal offset of the vehicle.

In this embodiment of this application, $C0_{fusion}$ is a horizontal offset of a road edge of the lane line obtained after fusion, $C3_{fusion}$ is a heading angle of the road edge of the lane line obtained after fusion, $C2_{fusion}$ is twice average curvature of the road edge of the lane line obtained after fusion, and $C3_{fusion}$ is six times an average curvature change rate of the road edge of the lane line obtained after fusion.

The road information detection apparatus may obtain ($C3_{fusion}$, $C2_{fusion}$, $C1_{fusion}$, $C0_{fusion}$), $P_{fusion}$ based on ($C3_{front,\ lane}$, $C2_{front,\ lane}$, $C0_{front,\ lane}$, $C0_{front,\ lane}$), $P_{front,\ lane}$; and ($C3_{rear,\ lane}$, $C2_{rear,\ lane}$, $C1_{rear,\ lane}$, $C0_{rear,\ lane}$), $P_{rear,\ lane}$.

In an optional manner, an example fusion manner is as follows.

A threshold may be first set. If a probability of road information collected by a specific collector is less than the threshold, the road information is considered as untrusted. For example, if $P_{front,\ lane}$ is less than the threshold, $C3_{front,\ lane}$, $C2_{front,\ lane}$, $C1_{front,\ lane}$, and $C0_{front,\ lane}$ are considered as untrusted, and only road information greater than or equal to the threshold is considered as trusted. For example, the threshold herein may be set to 0.5. It may be understood that the threshold may be another value such as 0.6, and this is not limited herein.

In this embodiment of this application, all probabilities may be compared with a same threshold, or different thresholds may be used. For example, the probability $P_{front,\ lane}$ that the front-looking lane line information exists is compared with a first threshold, and the probability $P_{rear,\ lane}$ that the rear-looking lane line information exists is compared with a second threshold. The first threshold and the second threshold are unequal. For example, the first threshold is 0.6, and the second threshold is 0.7.

If both $P_{front,\ lane}$ and $P_{rear,\ lane}$ are less than the specified threshold, it indicates that the road information is invalid.

If one of $P_{front,\ lane}$ and $P_{rear,\ lane}$ is less than the threshold, and the other is greater than or equal to the threshold, it indicates that one piece of road information is untrusted, and the other piece of road information is trusted. In this case, the trusted road information is directly used.

If both $P_{front,\ lane}$ and $P_{rear,\ lane}$ are greater than or equal to the threshold, it indicates that detection of two sources has specific credibility, and the following example method may be used.

$P_{fusion} = n/(1/P_{front,\ lane} + 1/P_{rear,\ lane})$, where n=2.

Then, this correspondence is solved.

$X_{fusion}/P_{fusion} = X_{front,\ lane}/P_{front,\ lane} + X_{rear,\ lane}/P_{rear,\ lane}$.

$X_{fusion}$ is a horizontal offset obtained after fusion.

The following is obtained:

$Ci_{fusion}$, where i is an integer from 0 to 3.

306: The road information detection apparatus outputs the target lane line information.

That the road information detection apparatus outputs the target lane line information includes: The road information detection apparatus outputs the correspondence, obtained in step 305, between the horizontal offset and the longitudinal offset of the target lane line in the traveling process of the vehicle. An output manner may be an image, a video, voice, or text. An output manner is not limited herein.

2. The road information detection apparatus fuses front-looking lane line information, rear-looking lane line information, front-looking lane structure information, and rear-looking lane structure information, to obtain the target lane line information.

Figure 4:
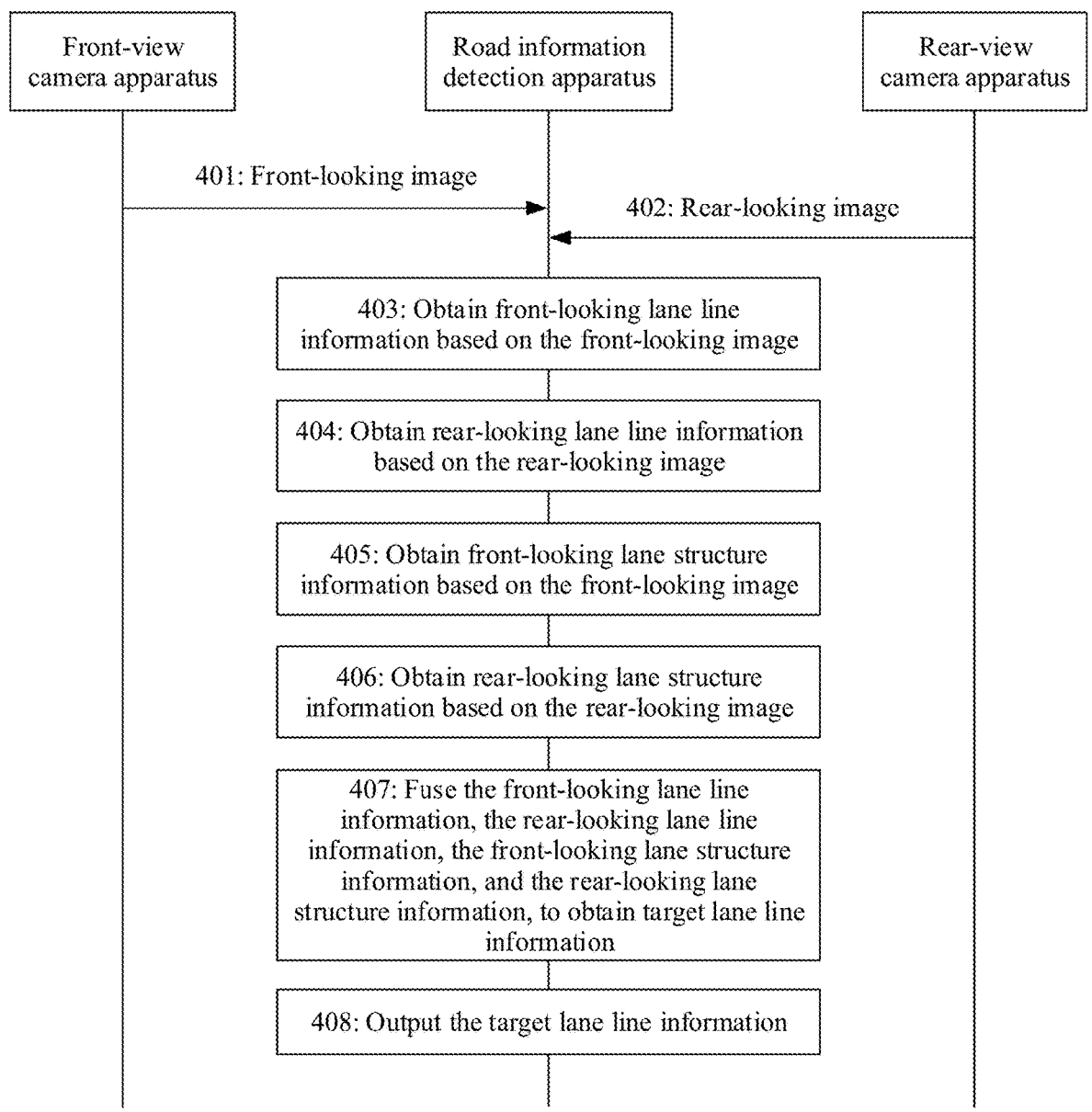
FIG. 4 is a schematic diagram of another embodiment of a road information detection method according to an embodiment of this application.

Refer to FIG. 4, another embodiment of a road information detection method in an embodiment of this application includes the following steps:

401: A road information detection apparatus receives a front-looking image.

402: The road information detection apparatus receives a rear-looking image.

403: The road information detection apparatus obtains front-looking lane line information based on the front-looking image.

404: The road information detection apparatus obtains rear-looking lane line information based on the rear-looking image.

Steps 401 to 404 in this embodiment are similar to steps 301 to 304 in the foregoing embodiment shown in FIG. 3, and details are not described herein again.

405: The road information detection apparatus obtains front-looking lane structure information based on the front-looking image.

The road information detection apparatus analyzes the front-looking image by using a technology such as an image detection technology or a visual recognition technology, to obtain the front-looking lane structure information. A technology is not limited herein.

406: The road information detection apparatus obtains rear-looking lane structure information based on the rear-looking image.

The road information detection apparatus analyzes the rear-looking image by using a technology such as an image detection technology or a visual recognition technology, to obtain the rear-looking lane structure information. A technology is not limited herein.

In this embodiment, there is no fixed time sequence relationship between steps 401, 403, and 405 and steps 402, 404, and 406.

407: The road information detection apparatus fuses the front-looking lane line information, the rear-looking lane line information, the front-looking lane structure information, and the rear-looking lane structure information, to obtain target lane line information.

Information obtained by using the front-looking image is referred to as front-looking information, such as the front-looking lane line information and the front-looking lane structure information, and information obtained by using the rear-looking image is referred to as rear-looking information, such as the rear-looking lane line information and the rear-looking lane structure information.

The road information detection apparatus may obtain lane line information based on an image obtained by a camera apparatus, such as a correspondence between a horizontal offset and a longitudinal offset of a lane line that changes with traveling of a vehicle and a probability that the lane line exists, and may further obtain information such as a width of a lane, a type of the lane line such as a one-way line or a deceleration line, color of the lane line such as yellow or white, and a width of the lane line by using the front-looking image.

The road information detection apparatus may further obtain lane structure information such as vehicle track information or road edge information based on the image obtained by the camera apparatus. The vehicle track information is track information of an observed vehicle that is obtained by using an image, for example, a traveling track of a vehicle, that is, the observed vehicle, that can be photographed by a camera and that is obtained based on a plurality of images. Traveling tracks of a plurality of observed vehicles are fused to obtain a correspondence between a horizontal offset and a longitudinal offset of a vehicle track, a probability that the vehicle track exists, and a status of the observed vehicle, for example, the observed vehicle is in a state of parking, traveling forward, or turning. A road edge is generally a boundary stone of an edge. Generally, the road edge is parallel to the lane line. The road information detection apparatus may obtain a correspondence between a horizontal offset and a longitudinal offset of the road edge that changes with traveling of the vehicle and a probability that the road edge exists, and may further obtain road edge information such as a type of the road edge such as a stone road edge or a fence, or a height of the road edge.

In this embodiment, the front-looking lane line information may include at least one of a correspondence between a horizontal offset and a longitudinal offset of a front-looking lane line in a traveling process of the vehicle, a probability that the front-looking lane line exists, a width of a front-looking lane, a type of the front-looking lane line, color of the front-looking lane line, and/or a width of the front-looking lane line. The rear-looking lane line information may include at least one of a correspondence between a horizontal offset and a longitudinal offset of a rear-looking lane line in the traveling process of the vehicle, a probability that the rear-looking lane line exists, a width of a rear-looking lane, a type of the rear-looking lane line, color of the rear-looking lane line, and/or a width of the rear-looking lane line.

In this embodiment, the front-looking lane structure information may include at least one of front-looking road edge information and/or front-looking vehicle track information in the traveling process of the vehicle. The front-looking road edge information may include at least one of a correspondence between a horizontal offset and a longitudinal offset of a front-looking road edge in the traveling process of the vehicle, a probability that the front-looking road edge exists, a type of the front-looking road edge, and/or a height of the front-looking road edge. The front-looking vehicle track information may include at least one of a correspondence between a horizontal offset and a longitudinal offset of a front-looking vehicle track in the traveling process of the vehicle, a probability that the front-looking vehicle track exists, and/or a status of a front-looking observed vehicle.

In this embodiment, the rear-looking lane structure information may include rear-looking road edge information. The rear-looking road edge information may include at least one of a correspondence between a horizontal offset and a longitudinal offset of a rear-looking road edge, a probability that the rear-looking road edge exists, a type of the rear-looking road edge, and/or a height of the rear-looking road edge.

In this embodiment, detailed descriptions are provided by using an example in which the front-looking lane line information is the correspondence between the horizontal offset and the longitudinal offset of the front-looking lane line in the traveling process of the vehicle and the probability that the front-looking lane line exists, an example in which the rear-looking lane line information is the correspondence between the horizontal offset and the longitudinal offset of the rear-looking lane line in the traveling process of the vehicle and the probability that the rear-looking lane line exists, an example in which the front-looking lane structure information is a correspondence between a horizontal offset and a longitudinal offset of a front-looking lane structure in the traveling process of the vehicle and a probability that the front-looking lane structure exists, where the correspondence between the horizontal offset and the longitudinal offset of the front-looking road edge and/or the correspondence between the horizontal offset and the longitudinal offset of the front-looking vehicle track are/is used as an example of the correspondence between the horizontal offset and the longitudinal offset of the front-looking lane structure, and the probability that the front-looking road edge exists and/or the probability that the front-looking vehicle track exists are/is used as an example of the probability that the front-looking lane structure exists, and an example in which the rear-looking lane structure information is a correspondence between a horizontal offset and a longitudinal offset of a rear-looking lane structure and a probability that the rear-looking lane structure exists, where the correspondence between the horizontal offset and the longitudinal offset of the rear-looking road edge is used as an example of the correspondence between the horizontal offset and the longitudinal offset of the rear-looking lane structure, and the probability that the rear-looking road edge exists is used as an example of the probability that the rear-looking lane structure exists.

Based on image information collected by a front-looking camera apparatus, the front-looking lane line is detected based on a road structure model by using a method such as image detection or deep learning, and corresponding lane line information is obtained. The lane line may be represented by using a curve of a specific road structure model. Different lane line representations may include a horizontal offset of a lane edge, a heading angle of the lane edge, average curvature of the lane line, and an average curvature change rate of the lane line. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the front-looking lane line may be represented as follows:

$$X_{front,lane} = C3_{front,lane} \times Z^3 + C2_{front,lane} \times Z^2 + C1_{front,lane} \times Z + C0_{front,lane}.$$

In this embodiment of this application, $C0_{front,\ lane}$ is a horizontal offset of a road edge of the front-looking lane line, $C1_{front,\ lane}$ is a heading angle of the road edge of the front-looking lane line, $C2_{front,\ lane}$ is twice average curvature of the road edge of the front-looking lane line, $C3_{front,\ lane}$ is six times an average curvature change rate of the road edge of the front-looking lane line, $X_{front,\ lane}$ is a horizontal offset of the vehicle, and $Z$ is a longitudinal offset of the vehicle.

In addition, the probability that the front-looking lane line exists may be further obtained through detection, and is represented as $P_{front,\ lane}$. The probability that the front-looking lane line exists is used to indicate a probability that the lane line exists in the front-looking image.

Based on image information collected by a rear-looking camera apparatus, the rear-looking lane line is detected based on a road structure model by using a method such as image detection or deep learning, and corresponding lane line information is obtained. The lane line may be represented by using a curve of a specific road structure model. Different lane line representations may include a horizontal offset of a lane edge, a heading angle of the lane edge, average curvature of the lane line, and an average curvature change rate of the lane line. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the rear-looking lane line may be represented as follows:

$$X_{rear,lane} = C3_{rear,lane} \times Z^3 + C2_{rear,lane} \times Z^2 + C1_{rear,lane} \times Z + C0_{rear,lane}.$$

In this embodiment of this application, $C0_{rear,\ lane}$ is a horizontal offset of a road edge of the rear-looking lane line, $C1_{rear,\ lane}$ is a heading angle of the road edge of the rear-looking lane line, $C2_{rear,\ lane}$ is twice average curvature of the road edge of the rear-looking lane line, $C3_{rear,\ lane}$ is six times an average curvature change rate of the road edge of the rear-looking lane line, $X_{rear,\ lane}$ is a horizontal offset of the vehicle, and $Z$ is a longitudinal offset of the vehicle.

In addition, the probability that the rear-looking lane line exists may be further obtained through detection, and is represented as $P_{rear,\ lane}$. The probability that the rear-looking lane line exists is used to indicate a probability that the lane line exists in the rear-looking image.

Based on image information collected by the front-looking camera apparatus, the front-looking road edge is detected based on a road structure model by using a method such as image detection or deep learning, and corresponding road edge information is obtained. The road edge may be represented by using a curve of a specific road structure model and a correspondence between a horizontal offset and a longitudinal offset. Different road edge representations may include a horizontal offset of a road edge, a heading angle of the road edge, average curvature of a road, and an average curvature change rate of the road. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the front-looking road edge may be represented as follows:

$$X_{front,edge} = C3_{front,edge} \times Z^3 + C2_{front,edge} \times Z^2 + C1_{front,edge} \times Z + C0_{front,edge}.$$

In this embodiment of this application, $C0_{front,\ edge}$ is a horizontal offset of a road edge related to the front-looking road edge, $C1_{front,\ edge}$ is a heading angle of the road edge related to the front-looking road edge, $C1_{front,\ edge}$ is twice average curvature of the road edge related to the front-looking road edge, $C1_{front,\ edge}$ is six times an average curvature change rate of the road edge related to the front-looking road edge, $X_{front,\ edge}$ is a horizontal offset of the vehicle, and Z is a longitudinal offset of the vehicle.

In addition, the probability that the front-looking road edge exists may be further obtained through detection, and is represented as $P_{front,\ edge}$. The probability that the front-looking road edge exists is used to indicate a probability that the road edge exists in the front-looking image.

Based on the image information collected by the front-looking camera apparatus, a front-looking observed vehicle is detected based on a road structure model by using a method such as image detection or deep learning, and corresponding vehicle track information is obtained. The vehicle track may be represented by using a curve of a specific road structure model and a correspondence between a horizontal offset and a longitudinal offset. Different vehicle track representations may include a horizontal offset of a road edge, a heading angle of the road edge, average curvature of a road, and an average curvature change rate of the road. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. A correspondence between a horizontal offset and a longitudinal offset of a vehicle track of an $i^{th}$ observed vehicle in vehicle tracks collected by the front-looking camera apparatus in the traveling process of the vehicle may be represented as follows:

$$X_{front,car(i)} = C3_{front,car(i)} \times Z^3 + C2_{front,car(i)} \times Z^2 + C1_{front,car(i)} \times Z + C0_{front,car(i)}.$$

In this embodiment of this application, $C0_{front,\ car(i)}$ is a horizontal offset of a road edge related to the vehicle track of the $i^{th}$ observed vehicle, $C1_{front,\ car(i)}$ is a heading angle of the road edge related to the vehicle track of the $i^{th}$ observed vehicle, $C2_{front,\ car(i)}$ is twice average curvature of the road edge related to the vehicle track of the $i^{th}$ observed vehicle, $C3_{front,\ car(i)}$ is six times an average curvature change rate of the road edge related to the vehicle track of the $i^{th}$ observed vehicle, X is a horizontal offset of the vehicle, and Z is a longitudinal offset of the vehicle.

A probability that the vehicle track of the $i^{th}$ observed vehicle exists may be represented as $P_{front,\ car(i)}$.

In an optional design, vehicle track information of each observed vehicle may be processed to obtain the front-looking vehicle track information, and a correspondence between a horizontal offset and a longitudinal offset of a front-looking vehicle track in the traveling process of the vehicle may be represented as follows:

$$X_{front,car} = C3_{front,car} \times Z^3 + C2_{front,car} \times Z^2 + C1_{front,car} \times Z + C0_{front,car}.$$

In this embodiment of this application, in parameters of the correspondence between the horizontal offset and the longitudinal offset of the front-looking vehicle track in the traveling process of the vehicle, $C0_{front,\ car}$ is a horizontal offset of a road edge related to a vehicle track of an observed vehicle, $C1_{front,\ car}$ is a heading angle of the road edge related to the vehicle track of the observed vehicle, $C2_{front,\ car}$ is twice average curvature of the road edge related to the vehicle track of the observed vehicle, $C3_{front,\ car}$ is six times an average curvature change rate of the road edge related to the vehicle track of the observed vehicle, $X_{front,\ car}$ is a horizontal offset of the vehicle, and Z is a longitudinal offset of the vehicle.

An example implementation may be as follows. Vehicle track information corresponding to an observed vehicle with a highest existence probability of a vehicle track is selected as the front-looking vehicle track information, or vehicle track information of all observed vehicles may be weighted and averaged to obtain the front-looking vehicle track information. This is not limited herein.

A probability that the front-looking vehicle track exists may be represented as $P_{front,\ car}$, and the probability that the front-looking vehicle track exists is used to indicate a probability that the vehicle track exists in the front-looking image.

Based on the image information collected by the rear-looking camera apparatus, the rear-looking road edge is detected based on a road structure model by using a method such as image detection or deep learning, and corresponding road edge information is obtained. The road edge may be represented by using a curve of a specific road structure model. Different road edge representations may include a horizontal offset of a road edge, a heading angle of the road edge, average curvature of a road, and an average curvature change rate of the road. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the rear-looking road edge may be represented as follows:

$$X_{rear,edge} = C3_{rear,edge} \times Z^3 + C2_{rear,edge} \times Z^2 + C1_{rear,edge} \times Z + C0_{rear,edge}.$$

In this embodiment of this application, $C0_{rear,edge}$ is a horizontal offset of a road edge related to the rear-looking road edge, $C1_{rear,edge}$ is a heading angle of the road edge related to the rear-looking road edge, $C2_{rear,edge}$ is twice average curvature of the road edge related to the rear-looking road edge, $C3_{rear,edge}$ is six times an average curvature change rate of the road edge related to the rear-looking road edge, $X_{rear,edge}$ is a horizontal offset of the vehicle, and Z is a longitudinal offset of the vehicle.

In addition, the probability that the rear-looking road edge exists may be further obtained through detection, and is represented as $P_{rear,edge}$. The probability that the rear-looking road edge exists is used to indicate a probability that the road edge exists in the rear-looking image.

In this embodiment, the foregoing correspondence between a horizontal offset and a longitudinal offset in the traveling process of the vehicle is merely used as an example for description. It may be understood that in actual application, a correspondence may have another form, for example, an equivalent variant of the foregoing correspondence between a horizontal offset and a longitudinal offset in the traveling process of the vehicle. This is not limited herein.

In this embodiment, the road information detection apparatus may fuse the front-looking lane line information, the rear-looking lane line information, the front-looking lane structure information, and the rear-looking lane structure information by using at least one of a plurality of fusion algorithms, to obtain the target lane line information. The fusion algorithm may be a Bayesian fusion algorithm, or may be another fusion algorithm such as a multi-hypothesis check algorithm. In this embodiment, a probability-based fusion algorithm is used as an example for a description.

In an optional design, a correspondence between a horizontal offset and a longitudinal offset of a target lane line obtained after fusion may be represented as follows:

$$X_{fusion} = C3_{fusion} \times Z^3 + C2_{fusion} \times Z^2 + C1_{fusion} \times Z + C0_{fusion},$$

where a probability that a lane line exists is $P_{fusion}$, X is a horizontal offset of the vehicle, and Z is a longitudinal offset of the vehicle.

In this embodiment of this application, $C0_{fusion}$ is a horizontal offset of a road edge of the lane line obtained after fusion, $C1_{fusion}$ is a heading angle of the road edge of the lane line obtained after fusion, $C2_{fusion}$ is twice average curvature of the road edge of the lane line obtained after fusion, and $C3_{fusion}$ is six times an average curvature change rate of the road edge of the lane line obtained after fusion.

The road information detection apparatus obtains ($C3_{fusion}$, $C2_{fusion}$, $C1_{fusion}$, $C0_{fusion}$), $P_{fusion}$ based on ($C3_{front, lane}$, $C2_{front, lane}$, $C1_{front, lane}$, $C0_{front, lane}$), $P_{front, lane}$; ($C3_{rear, lane}$, $C2_{rear, lane}$, $C1_{rear, lane}$, $C0_{rear, lane}$), $P_{rear, lane}$; ($C3_{front, edge}$, $C2_{front, edge}$, $C1_{front, edge}$, $C0_{front, edge}$), $P_{front, edge}$; ($C3_{front, car}$, $C2_{front, car}$, $C1_{front, car}$, $C0_{front, car}$), $P_{front, car}$; and ($C3_{rear, edge}$, $C2_{rear, edge}$, $C1_{rear, edge}$, $C0_{rear, edge}$), $P_{rear, edge}$.

In an optional manner, an example manner is as follows.

A threshold may be first set. If a probability of road information collected by a specific collector is less than the threshold, the road information is considered as untrusted. For example, if $P_{front, lane}$ is less than the threshold, $C3_{front, lane}$, $C2_{front, lane}$, $C1_{front, lane}$, and $C0_{front, lane}$ are considered as untrusted, and only road information greater than or equal to the threshold is considered as trusted. For example, the threshold herein may be set to 0.5. It may be understood that the threshold may be another value such as 0.6, and this is not limited herein.

In this embodiment of this application, all probabilities may be compared with a same threshold, or different thresholds may be used. For example, the probability $P_{front, lane}$ that the front-looking lane line information exists is compared with a first threshold, and the probability $P_{rear, lane}$ that the rear-looking lane line information exists is compared with a second threshold. The first threshold and the second threshold are unequal. For example, the first threshold is 0.6, and the second threshold is 0.7.

If probabilities of all collected road information are less than the specified threshold, it indicates that the road information collected this time is invalid.

If a probability of only one piece of collected road information is greater than or equal to the threshold, it indicates that road information corresponding to a probability higher than the threshold is trusted, and other road information is untrusted. In this case, the trusted road information is directly used.

Detection information greater than or equal to the threshold in all the foregoing road detection information is selected, and the following example method is used.

$P_{fusion} = n/(1/P_{front, lane} + 1/P_{rear, lane} + 1/P_{front, edge} + 1/P_{front, car} + 1/P_{rear, edge})$, where n=5.

Then, this correspondence is solved.

$X_{fusion}/P_{fusion} = X_{front, lane}/P_{front, lane} + X_{rear, lane}/P_{rear, lane} + X_{front, edge}/P_{front, edge} + X_{front, car}/P_{front, car} + X_{rear, edge}/P_{rear, edge}$, where $X_{fusion}$ is a horizontal offset obtained after fusion.

The following is obtained:

$Ci_{fusion}$, where i is an integer from 0 to 3.

It may be understood that the threshold may not be set in actual application. For example, the road information detection apparatus determines that all parameters are valid parameters.

408: The road information detection apparatus outputs the target lane line information.

That the road information detection apparatus outputs the target lane line information includes: The road information detection apparatus outputs the correspondence, obtained in step 407, between the horizontal offset and the longitudinal offset of the target lane line in the traveling process of the vehicle. An output manner may be an image, a video, voice, or text. An output manner is not limited herein.

3. The road information detection apparatus fuses front-looking lane line information, rear-looking lane line information, and radar lane structure information, to obtain the target lane line information.

Figure 5:
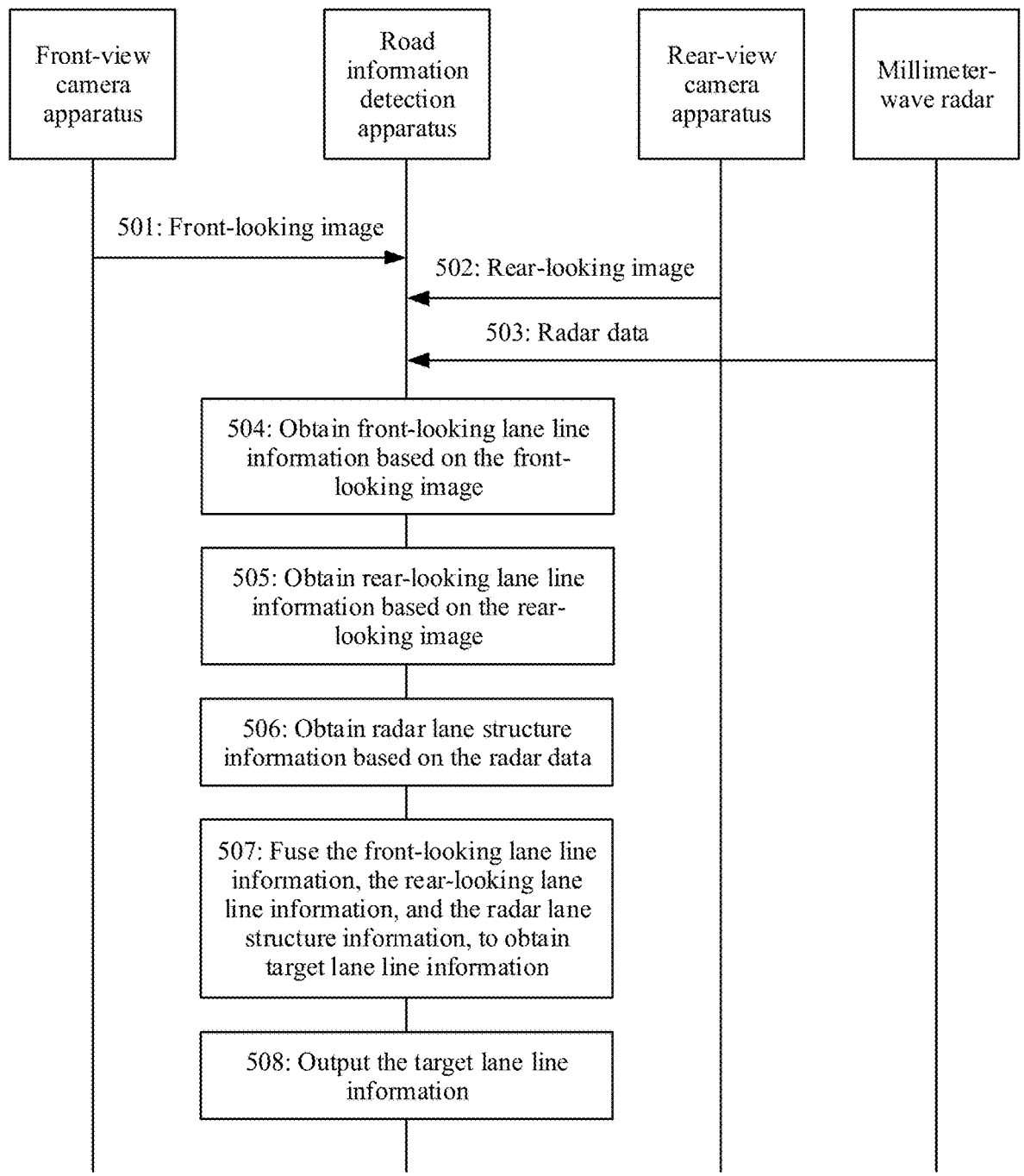
FIG. 5 is a schematic diagram of another embodiment of a road information detection method according to an embodiment of this application.

Refer to FIG. 5, another embodiment of a road information detection method in an embodiment of this application includes the following steps.

501: A road information detection apparatus receives a front-looking image.

502: The road information detection apparatus receives a rear-looking image.

Steps 501 and 502 in this embodiment are similar to steps 301 and 302 in the foregoing embodiment shown in FIG. 3, and details are not described herein again.

503: The road information detection apparatus receives radar data.

The road information detection apparatus is connected to a millimeter-wave radar. The connection may be a wired connection or a wireless connection, and this is not limited herein. If the connection is a wired connection, the road information detection apparatus may receive, by using a data transmission line, radar data detected by the millimeter-wave radar. If the connection is a wireless connection, the road information detection apparatus may receive, by using a wireless network, radar data detected by the millimeter-wave radar. The wireless network may be a public network wireless network or a dedicated network wireless network, and this is not limited herein.

504: The road information detection apparatus obtains front-looking lane line information based on the front-looking image.

505: The road information detection apparatus obtains rear-looking lane line information based on the rear-looking image.

Steps 404 and 405 in this embodiment are similar to steps 303 and 304 in the foregoing embodiment shown in FIG. 3, and details are not described herein again.

506: The road information detection apparatus obtains radar lane structure information based on the radar data.

The road information detection apparatus obtains the radar lane structure information based on the radar data by using a method such as a clustering algorithm, a graph model method, Hough transform, machine learning, or the like.

In this embodiment, there is no fixed time sequence relationship between steps 501 and 504, steps 502 and 505, and steps 503 and 506.

507: The road information detection apparatus fuses the front-looking lane line information, the rear-looking lane line information, and the radar lane structure information, to obtain target lane line information.

Information obtained by the road information detection apparatus by using the front-looking image is referred to as front-looking information, such as the front-looking lane line information, and information obtained by using the rear-looking image is referred to as rear-looking information, such as the rear-looking lane line information. The road information detection apparatus may obtain lane line information based on an image obtained by a camera apparatus, such as a correspondence between a horizontal offset and a longitudinal offset of a lane line that changes with traveling of a vehicle and a probability that the lane line exists, and may further obtain information such as a width of a lane, a type of the lane line such as a one-way line or a deceleration line, color of the lane line such as yellow or white, and a width of the lane line by using the front-looking image.

Information obtained by the road information detection apparatus by using the radar data is referred to as radar information, such as radar lane line information. The road information detection apparatus may further obtain lane structure information such as vehicle track information or road edge information based on the radar data obtained by the millimeter-wave radar. The vehicle track information is track information of an observed vehicle that is obtained by using the radar data, for example, a traveling track of a vehicle, that is, the observed vehicle, that can be collected by using a signal obtained based on radar data collected by the millimeter-wave radar for a plurality of times. Traveling tracks of a plurality of observed vehicles are fused to obtain a correspondence between a horizontal offset and a longitudinal offset of a vehicle track, a probability that the vehicle track exists, and a status of the observed vehicle, for example, the observed vehicle is in a state of parking, traveling forward, or turning. A road edge is generally a boundary stone of an edge. Generally, the road edge is parallel to the lane line. The road information detection apparatus may obtain a correspondence between a horizontal offset and a longitudinal offset of the road edge that changes with traveling of the vehicle and a probability that the road edge exists, and may further obtain road edge information such as a type of the road edge such as a stone road edge or a fence, or a height of the road edge.

In this embodiment, the front-looking lane line information may include at least one of a correspondence between a horizontal offset and a longitudinal offset of a front-looking lane line in a traveling process of the vehicle, a probability that the front-looking lane line exists, a width of a front-looking lane, a type of the front-looking lane line, color of the front-looking lane line, and/or a width of the front-looking lane line. The rear-looking lane line information may include at least one of a correspondence between a horizontal offset and a longitudinal offset of a rear-looking lane line in the traveling process of the vehicle, a probability that the rear-looking lane line exists, a width of a rear-looking lane, a type of the rear-looking lane line, color of the rear-looking lane line, and/or a width of the rear-looking lane line.

In this embodiment, the radar lane structure information may include at least one of radar vehicle track information and/or radar road edge information in the traveling process of the vehicle, and the radar vehicle track information may include at least one of a correspondence between a horizontal offset and a longitudinal offset of a radar vehicle track in the traveling process of the vehicle, a probability that the radar vehicle track exists, and/or a status of a radar observed vehicle. The radar road edge information may include at least one of a correspondence between a horizontal offset and a longitudinal offset of a radar road edge in the traveling process of the vehicle, a probability that the radar road edge exists, a type of the radar road edge, and/or a height of the radar road edge.

In this embodiment, detailed descriptions are provided by using an example in which the front-looking lane line information is the correspondence between the horizontal offset and the longitudinal offset of the front-looking lane line in the traveling process of the vehicle and the probability that the front-looking lane line exists, an example in which the rear-looking lane line information is the correspondence between the horizontal offset and the longitudinal offset of the rear-looking lane line in the traveling process of the vehicle and the probability that the rear-looking lane line exists, and an example in which the radar lane structure information is a correspondence between a horizontal offset and a longitudinal offset of a radar lane structure in the traveling process of the vehicle and a probability that the radar lane structure exists, where the correspondence between the horizontal offset and the longitudinal offset of the radar road edge and/or the correspondence between the horizontal offset and the longitudinal offset of radar vehicle track are/is used as an example of the correspondence between the horizontal offset and the longitudinal offset of the radar lane structure, and the probability that the radar road edge exists and/or the probability that the radar vehicle track exists are/is used as the probability that the radar lane structure exists.

Based on image information collected by the front-looking camera apparatus, the front-looking lane line is detected based on a road structure model by using a method such as image detection or deep learning, and corresponding lane line information is obtained. The lane line may be represented by using a curve of a specific road structure model. Different lane line representations may include a horizontal offset of a lane edge, a heading angle of the lane edge, average curvature of the lane line, and an average curvature change rate of the lane line. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the front-looking lane line may be represented as follows:

$$X_{front,lane} = C3_{front,lane} \times Z^3 + C2_{front,lane} \times Z^2 + C1_{front,lane} \times Z + C0_{front,lane}.$$

In this embodiment of this application, $C0_{front,\ lane}$ is a horizontal offset of a road edge of the front-looking lane line, $C1_{front,\ lane}$ is front-looking a heading angle of the road edge of the lane line, $C2_{front,\ lane}$ is twice average curvature of the road edge of the front-looking lane line, $C3_{front,\ lane}$ is six times an average curvature change rate of the road edge of the front-looking lane line, $X_{front,\ lane}$ is a horizontal offset of the vehicle, and Z is a longitudinal offset of the vehicle.

In addition, the probability that the front-looking lane line exists may be further obtained through detection, and is represented as $P_{front,\ lane}$. The probability that the front-looking lane line exists is used to indicate a probability that the lane line exists in the front-looking image.

Based on image information collected by the rear-looking camera apparatus, the rear-looking lane line is detected based on a road structure model by using a method such as image detection or deep learning, and corresponding lane line information is obtained. The lane line may be represented by using a curve of a specific road structure model. Different lane line representations may include a horizontal offset of a lane edge, a heading angle of the lane edge, average curvature of the lane line, and an average curvature change rate of the lane line. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the rear-looking lane line may be represented as follows:

$$X_{rear,lane} = C3_{rear,lane} \times Z^3 + C2_{rear,lane} \times Z^2 + C1_{rear,lane} \times Z + C0_{rear,lane}.$$

In this embodiment of this application, $C0_{rear,\ lane}$ is a horizontal offset of a road edge of the rear-looking lane line, $C1_{rear,\ lane}$ is a heading angle of the road edge of the rear-looking lane line, $C2_{rear,\ lane}$ is twice average curvature of the road edge of the rear-looking lane line, $C3_{rear,\ lane}$ is six times an average curvature change rate of the road edge of the rear-looking lane line, $X_{rear,\ lane}$ is a horizontal offset of the vehicle, and Z is a longitudinal offset of the vehicle.

In addition, the probability that the rear-looking lane line exists may be further obtained through detection, and is represented as $P_{rear,\ lane}$. The probability that the rear-looking lane line exists is used to indicate a probability that the lane line exists in the rear-looking image.

Based on the radar information collected by the millimeter-wave radar, the radar information is detected based on a road structure model by using a method such as deep learning, and corresponding road edge information is obtained. The road edge may be represented by using a curve of a specific road structure model. Different road edge representations may include a horizontal offset of a road edge, a heading angle of the road edge, average curvature of a road, and an average curvature change rate of the road. An optional formula representation method for the road structure model is provided below. However, this application is not limited thereto, and the road structure model may be determined or indicated by at least one of the foregoing parameters. In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the radar road edge may be represented as follows:

$$X_{radar,edge} = C3_{radar,edge} \times Z^3 + C2_{radar,edge} \times Z^2 + C1_{radar,edge} \times Z + C0_{radar,edge}.$$

In this embodiment of this application, $C0_{radar,\ edge}$ is a horizontal offset of a road edge obtained based on the radar road edge information, $C1_{radar,\ edge}$ is a heading angle of the road edge obtained based on the radar road edge information, $C2_{radar,\ edge}$ is twice average curvature of the road edge obtained based on the radar road edge information, $C3_{radar,\ edge}$ is six times an average curvature change rate of the road edge obtained based on the radar road edge information, $X_{radar,\ edge}$ is a horizontal offset of the vehicle, and Z is a longitudinal offset of the vehicle.

In addition, the probability that the radar road edge exists may be further obtained through detection, and is represented as $P_{radar,\ lane}$. The probability that the radar road edge exists is used to indicate a probability that a road edge detected by the millimeter-wave radar exists.

Based on the radar information collected by the millimeter-wave radar, track information of one or more observed vehicles that is collected by one or more vehicles may be analyzed based on a road structure model by using a method such as depth learning, and a vehicle track may be represented by using a curve of a specific road structure model. Different vehicle track representations may include a horizontal offset of a road edge, a heading angle of the road edge, average curvature of a road, and an average curvature change rate of the road. An optional formula representation method is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. A correspondence between a horizontal offset and a longitudinal offset of a vehicle track of an $i^{th}$ observed vehicle in vehicle tracks collected by the millimeter-wave radar in the traveling process of the vehicle may be represented as follows:

$$X_{radar,car(i)} = C3_{radar,car(i)} \times Z^3 + C2_{radar,car(i)} \times Z^2 + C1_{radar,car(i)} \times Z + C0_{radar,car(i)}.$$

In this embodiment of this application, $C0_{radar,\ car(i)}$ is a horizontal offset of a road edge related to the vehicle track of the $i^{th}$ observed vehicle, $C1_{radar,\ car(i)}$ is a heading angle of the road edge related to the vehicle track of the $i^{th}$ observed vehicle, $C2_{radar,\ car(i)}$ is twice average curvature of the road edge related to the vehicle track of the $i^{th}$ observed vehicle, $C3_{radar,\ car(i)}$ is six times an average curvature change rate of the road edge related to the vehicle track of the $i^{th}$ observed vehicle, X is a horizontal offset of the vehicle, and Z is a longitudinal offset of the vehicle.

A probability that a vehicle track of a target vehicle exists may be represented as $P_{radar,\ car(i)}$.

In an optional design, vehicle track information of each target vehicle may be processed to obtain radar vehicle track information, and a correspondence between a horizontal offset and a longitudinal offset of a radar vehicle track in the traveling process of the vehicle may be represented as follows:

$$X_{radar,car} = C3_{radar,\ car} \times Z^3 + C2_{radar,car} \times Z^2 + C1_{radar,car} \times Z + C0_{radar,car}.$$

In this embodiment of this application, in parameters of the correspondence between the horizontal offset and the longitudinal offset of the radar vehicle track in the traveling process of the vehicle, $C0_{radar,\ car}$ is a horizontal offset of a road edge related to a vehicle track of an observed vehicle, $C1_{radar,\ car}$ is a heading angle of the road edge related to the vehicle track of the observed vehicle, $C2_{radar,\ car}$ is twice average curvature of the road edge related to the vehicle track of the observed vehicle, $C3_{radar,\ car}$ is six times an average curvature change rate of the road edge related to the vehicle track of the observed vehicle, $X_{radar,\ car}$ is a horizontal offset of the vehicle, and Z is a longitudinal offset of the vehicle.

An implementation may be as follows. Radar vehicle track information corresponding to an observed vehicle with a highest existence probability of a vehicle track is selected as radar vehicle track information of a to-be-observed vehicle, or vehicle track information of all observed vehicles may be weighted and averaged to obtain the radar vehicle track information. This is not limited herein.

A probability that the radar vehicle track exists may be represented as $P_{radar,\ car}$ and the probability that the radar vehicle track exists is used to indicate a probability that a vehicle track detected by the millimeter-wave radar exists.

In this embodiment, the foregoing correspondence between a horizontal offset and a longitudinal offset in the traveling process of the vehicle is merely used as an example for description. It may be understood that in actual application, a correspondence may have another form, for example, an equivalent variant of the foregoing correspondence between a horizontal offset and a longitudinal offset in the traveling process of the vehicle. This is not limited herein.

In this embodiment, the road information detection apparatus may fuse the front-looking lane line information, the rear-looking lane line information, and the radar lane structure information by using at least one of a plurality of fusion algorithms, to obtain the target lane line information. The fusion algorithm may be a Bayesian fusion algorithm, or may be another fusion algorithm such as a multi-hypothesis check algorithm. In this embodiment, a probability-based fusion algorithm is used as an example for a description.

In an optional design, a correspondence of a target lane line obtained after fusion may be represented as follows:

$$X_{fusion} = C3_{fusion} \times Z^3 + C2_{fusion} \times Z^2 + C1_{fusion} \times Z + C0_{fusion}.$$

where a probability that a lane line exists is $P_{fusion}$, X is a horizontal offset of the vehicle, and Z is a longitudinal offset of the vehicle.

In this embodiment of this application, $C0_{fusion}$ is a horizontal offset of a road edge of the lane line obtained after fusion, $C1_{fusion}$ is a heading angle of the road edge of the lane line obtained after fusion, $C2_{fusion}$ is twice average curvature of the road edge of the lane line obtained after fusion, and $C3_{fusion}$ is six times an average curvature change rate of the road edge of the lane line obtained after fusion.

The road information detection apparatus obtains $(C3_{fusion},\ C2_{fusion},\ C1_{fusion},\ C0_{fusion})$, $P_{fusion}$ based on $(C3_{front,\ lane},\ C2_{front,\ lane},\ C1_{front,\ lane},\ C0_{front,\ lane})$, $P_{front,\ lane}$; $(C3_{rear,\ lane},\ C2_{rear,\ lane},\ C1_{rear,\ lane},\ C0_{rear,\ lane})$, $P_{rear,\ lane}$; $(C3_{radar,\ car},\ C2_{radar,\ car},\ C1_{radar,\ car},\ C0_{radar,\ car})$, $P_{radar,\ car}$; and $(C3_{radar,\ edge},\ C2_{radar,\ edge},\ C1_{radar,\ edge},\ C0_{radar,\ edge})$, $P_{radar,\ edge}$.

In an optional manner, an example manner is as follows.

A threshold may be first set. If a probability of road information collected by a specific collector is less than the threshold, the road information is considered as untrusted. For example, if $P_{front,\ lane}$ is less than the threshold, $C3_{front,\ lane},\ C2_{front,\ lane},\ C1_{front,\ lane},$ and $C0_{front,\ lane}$ are considered as untrusted, and only road information greater than or equal to the threshold is considered as trusted. For example, the threshold herein may be set to 0.5. It may be understood that the threshold may be another value such as 0.6, and this is not limited herein.

In this embodiment of this application, all probabilities may be compared with a same threshold, or different thresholds may be used. For example, the probability $P_{front,\ lane}$ that the front-looking lane line information exists is compared with a first threshold, and the probability $P_{rear,\ lane}$ that the rear-looking lane line information exists is compared with a second threshold. The first threshold and the second threshold are unequal. For example, the first threshold is 0.6, and the second threshold is 0.7.

If probabilities of all collected road information are less than the specified threshold, it indicates that the road information collected this time is invalid.

If a probability of only one piece of collected road information is greater than or equal to the threshold, it indicates that road information corresponding to a probability higher than the threshold is trusted, and other road information is untrusted. In this case, the trusted road information is directly used.

Detection information greater than or equal to the threshold in all the foregoing road detection information is selected, and the following example method is used.

$P_{fusion} = n/(1/P_{front,\ lane} + 1/P_{rear,\ lane} + 1/P_{front,\ car} + 1)/P_{front,\ edge})$, where n=4.

Then, this correspondence is solved.

$X_{fusion}/P_{fusion} = X_{front,\ lane}/P_{front,\ lane} + X_{rear,\ lane}/P_{rear,\ lane} + X_{radar,\ car}/P_{radar,\ car} + X_{radar,\ edge}/P_{radar,\ edge}$, where $X_{fusion}$ is a horizontal offset obtained after fusion.

The following is obtained:

$Ci_{fusion}$, where i is an integer from 0 to 3.

It may be understood that the threshold may not be set in actual application. For example, the road information detection apparatus determines that all parameters are valid parameters.

508: The road information detection apparatus outputs the target lane line information.

That the road information detection apparatus outputs the target lane line information includes: The road information detection apparatus outputs the correspondence, obtained in step 507, between the horizontal offset and the longitudinal offset of the target lane line in the traveling process of the vehicle. An output manner may be an image, a video, voice, or text. An manner is not limited herein.

4. The road information detection apparatus fuses front-looking lane line information, rear-looking lane line information, front-looking lane structure information, rear-looking lane structure information, and radar lane structure information, to obtain the target lane line information.

Figure 6:
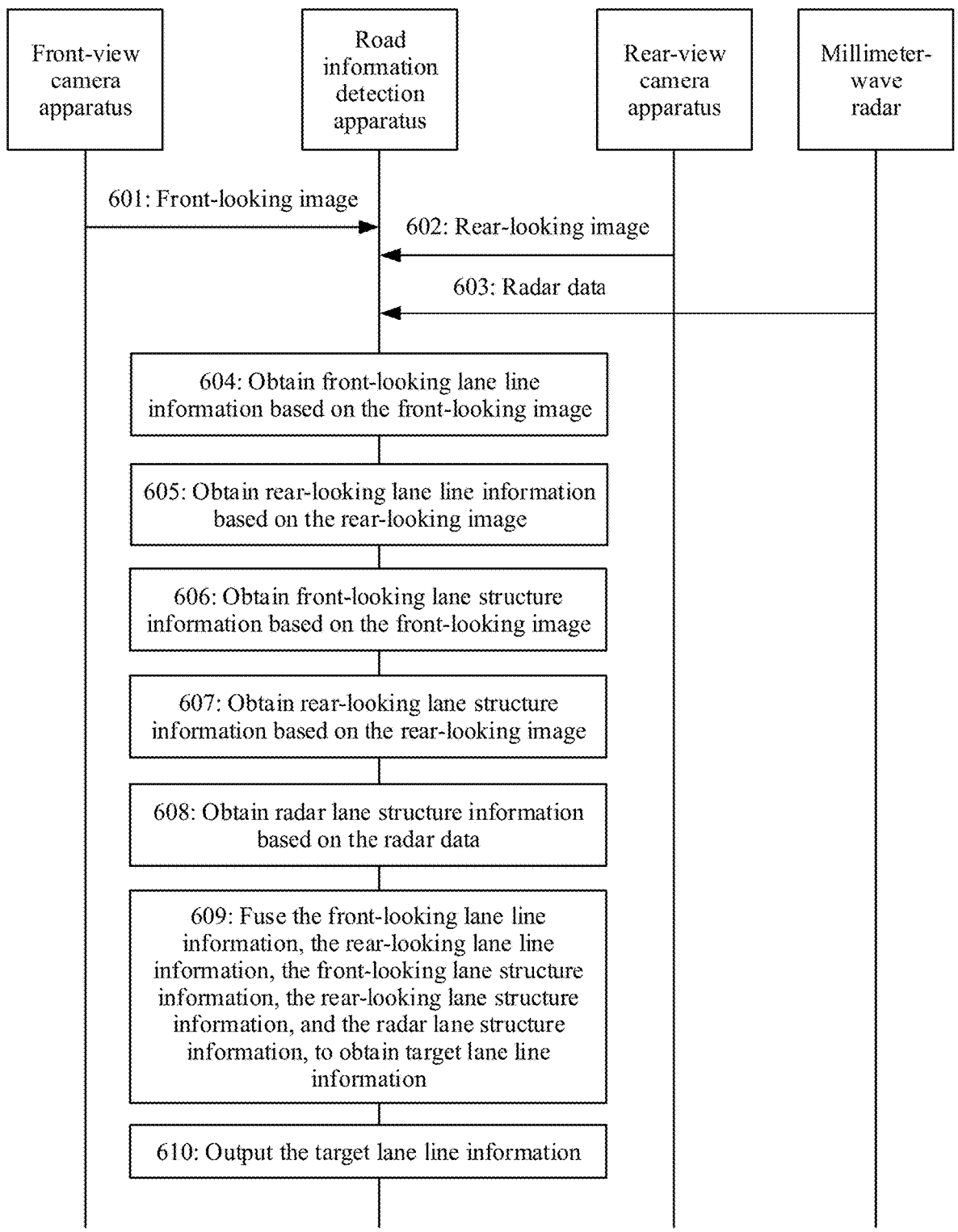
FIG. 6 is a schematic diagram of another embodiment of a road information detection method according to an embodiment of this application.

Refer to FIG. 6, another embodiment of a road information detection method in an embodiment of this application includes the following steps:

601: A road information detection apparatus receives a front-looking image.

602: The road information detection apparatus receives a rear-looking image.

603: The road information detection apparatus receives radar data.

604: The road information detection apparatus obtains front-looking lane line information based on the front-looking image.

605: The road information detection apparatus obtains rear-looking lane line information based on the rear-looking image.

Steps 601 to 605 in this embodiment are similar to steps 501 to 505 in the foregoing embodiment shown in FIG. 5, and details are not described herein again.

606: The road information detection apparatus obtains front-looking lane structure information based on the front-looking image.

607: The road information detection apparatus obtains rear-looking lane structure information based on the rear-looking image.

Steps 606 and 607 in this embodiment are similar to steps 405 and 406 in the foregoing embodiment shown in FIG. 4, and details are not described herein again.

608: The road information detection apparatus obtains radar lane structure information based on the radar data.

Step 608 in this embodiment is similar to step 506 in the foregoing embodiment shown in FIG. 5, and details are not described herein again.

In this embodiment, there is no fixed time sequence relationship between steps 601, 604, and 606, steps 602, 605, and 607, and steps 603, 606, and 608.

609: The road information detection apparatus fuses the front-looking lane line information, the rear-looking lane line information, the front-looking lane structure information, the rear-looking lane structure information, and the radar lane structure information, to obtain target lane line information.

Information obtained by the road information detection apparatus by using the front-looking image is referred to as front-looking information, such as the front-looking lane line information and the front-looking lane structure information; information obtained by using the rear-looking image is referred to as rear-looking information, such as the rear-looking lane line information and the rear-looking lane structure information; and information obtained by using the radar data is referred to as radar information, such as the radar lane line information and the radar lane structure information.

The road information detection apparatus may obtain lane line information based on an image obtained by a camera apparatus or radar data obtained by a millimeter-wave radar, for example, a correspondence between a horizontal offset and a longitudinal offset of a lane line that changes with traveling of a vehicle, a probability that the lane line exists, and information such as a width of a lane, a type of the lane line such as a one-way line or a deceleration line, color of the lane line such as yellow or white, and a width of the lane line.

The road information detection apparatus may further obtain lane structure information such as vehicle track information or road edge information based on the image obtained by the camera apparatus or the radar data obtained by the millimeter-wave radar. The vehicle track information is traveling track information of an observed vehicle, and traveling tracks of a plurality of observed vehicles are fused to obtain a correspondence between a horizontal offset and a longitudinal offset of a vehicle track, a probability that the vehicle track exists, and a status of the observed vehicle, for example, the observed vehicle is in a state of parking, traveling forward, or turning. A road edge is generally a boundary stone of an edge. Generally, the road edge is parallel to the lane line. The road information detection apparatus may obtain a correspondence between a horizontal offset and a longitudinal offset of the road edge that changes with traveling of the vehicle and a probability that the road edge exists, and may further obtain road edge information such as a type of the road edge such as a stone road edge or a fence, or a height of the road edge.

In this embodiment, the front-looking lane line information may include at least one of a correspondence between a horizontal offset and a longitudinal offset of a front-looking lane line in a traveling process of the vehicle, a probability that the front-looking lane line exists, a width of a front-looking lane, a type of the front-looking lane line, color of the front-looking lane line, and/or a width of the front-looking lane line. The rear-looking lane line information may include at least one of a correspondence between a horizontal offset and a longitudinal offset of a rear-looking lane line in the traveling process of the vehicle, a probability that the rear-looking lane line exists, a width of a rear-looking lane, a type of the rear-looking lane line, color of the rear-looking lane line, and/or a width of the rear-looking lane line.

In this embodiment, the front-looking lane structure information may include at least one of front-looking road edge information and/or front-looking vehicle track information in the traveling process of the vehicle. The front-looking road edge information may include at least one of a correspondence between a horizontal offset and a longitudinal offset of a front-looking road edge in the traveling process of the vehicle, a probability that the front-looking road edge exists, a type of the front-looking road edge, and/or a height of the front-looking road edge. The front-looking vehicle track information may include at least one of a correspondence between a horizontal offset and a longitudinal offset of a front-looking vehicle track in the traveling process of the vehicle, a probability that the front-looking vehicle track exists, and/or a status of a front-looking observed vehicle.

In this embodiment, the rear-looking lane structure information may include rear-looking road edge information. The rear-looking road edge information may include at least one of a correspondence between a horizontal offset and a longitudinal offset of a rear-looking road edge in the traveling process of the vehicle, a probability that the rear-looking road edge exists, a type of the rear-looking road edge, and/or a height of the rear-looking road edge.

In this embodiment, the radar lane structure information may include at least one of radar vehicle track information and/or radar road edge information in the traveling process of the vehicle, and the radar vehicle track information may include at least one of a correspondence between a horizontal offset and a longitudinal offset of a radar vehicle track in the traveling process of the vehicle, a probability that the radar vehicle track exists, and/or a status of a radar observed vehicle. The radar road edge information may include at least one of a correspondence between a horizontal offset and a longitudinal offset of a radar road edge in the traveling process of the vehicle, a probability that the radar road edge exists, a type of the radar road edge, and/or a height of the radar road edge.

In this embodiment, detailed descriptions are provided by using an example in which the front-looking lane line information is the correspondence between the horizontal offset and the longitudinal offset of the front-looking lane line in the traveling process of the vehicle and the probability that the front-looking lane line exists, an example in which the rear-looking lane line information is the correspondence between the horizontal offset and the longitudinal offset of the rear-looking lane line in the traveling process of the vehicle and the probability that the rear-looking lane line exists, an example in which the front-looking lane structure information is a correspondence between a horizontal offset and a longitudinal offset of a front-looking lane structure in the traveling process of the vehicle and a probability that the front-looking lane structure exists, where the correspondence between the horizontal offset and the longitudinal offset of the front-looking road edge and/or the correspondence between the horizontal offset and the longitudinal offset of the front-looking vehicle track are/is used as an example of the correspondence between the horizontal offset and the longitudinal offset of the front-looking lane structure, and the probability that the front-looking road edge exists and/or the probability that the front-looking vehicle track exists are/is used as an example of the probability that the front-looking lane structure exists, an example in which the rear-looking lane structure information is a correspondence between a horizontal offset and a longitudinal offset of a rear-looking lane structure in the traveling process of the vehicle and a probability that the rear-looking lane structure exists, where the correspondence between the horizontal offset and the longitudinal offset of the rear-looking road edge is used as an example of the correspondence between the horizontal offset and the longitudinal offset of the rear-looking lane structure, and the probability that the rear-looking road edge exists is used as an example of the probability that the rear-looking lane structure exists, and an example in which the radar lane structure information is a correspondence between a horizontal offset and a longitudinal offset of a radar lane structure in the traveling process of the vehicle and a probability that the radar lane structure exists, where the correspondence between the horizontal offset and the longitudinal offset of the radar road edge and/or the correspondence between the horizontal offset and the longitudinal offset of the radar vehicle track are/is used as an example of the correspondence between the horizontal offset and the longitudinal offset of the radar lane structure, and the probability that the radar road edge exists and/or the probability that the radar vehicle track exists are/is used as an example of the probability that the radar lane structure exists.

Based on image information collected by a front-looking camera apparatus, the front-looking lane line is detected based on a road structure model by using a method such as image detection or deep learning, and corresponding lane line information is obtained. The lane line may be represented by using a curve of a specific road structure model. Different lane line representations may include a horizontal offset of a lane edge, a heading angle of the lane edge, average curvature of the lane line, and an average curvature change rate of the lane line. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the front-looking lane line may be represented as follows:

$$X_{front,lane}=C3_{front,lane} \times Z^3 + C2_{front,lane} \times Z^2 + C1_{front,car(i)} \times Z + C0_{front,lane}.$$

In this embodiment of this application, $C0_{front,\ lane}$ is a horizontal offset of a road edge of the front-looking lane line, $C1_{front,\ lane}$ is front-looking a heading angle of the road edge of the lane line, $C2_{front,\ lane}$ is twice average curvature of the road edge of the front-looking lane line, $C3_{front,\ lane}$ is six times an average curvature change rate of the road edge of the front-looking lane line, $X_{front,\ lane}$ is a horizontal offset of the vehicle, and Z is a longitudinal offset of the vehicle.

In addition, the probability that the front-looking lane line exists may be further obtained through detection, and is represented as $P_{front,\ lane}$. The probability that the front-looking lane line exists is used to indicate a probability that the lane line exists in the front-looking image.

Based on image information collected by a rear-looking camera apparatus, the rear-looking lane line is detected based on a road structure model by using a method such as image detection or deep learning, and corresponding lane line information is obtained. The lane line may be represented by using a curve of a specific road structure model. Different lane line representations may include a horizontal offset of a lane edge, a heading angle of the lane edge, average curvature of the lane line, and an average curvature change rate of the lane line. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the rear-looking lane line may be represented as follows:

$$X_{rear,lane}=C3_{rear,lane} \times Z^3 + C2_{rear,lane} \times Z^2 + C1_{rear,lane} \times Z + C0_{rear,lane}.$$

In this embodiment of this application, $C0_{rear,\ lane}$ is a horizontal offset of a road edge of the rear-looking lane line, $C1_{rear,\ lane}$ is a heading angle of the road edge of the rear-looking lane line, $C2_{rear,\ lane}$ is twice average curvature of the road edge of the rear-looking lane line, $C3_{rear,\ lane}$ is six times an average curvature change rate of the road edge of the rear-looking lane line, $X_{rear,\ lane}$ is a horizontal offset of the vehicle, and Z is a longitudinal offset of the vehicle.

In addition, the probability that the rear-looking lane line exists may be further obtained through detection, and is represented as $P_{rear,\,lane}$. The probability that the rear-looking lane line exists is used to indicate a probability that the lane line exists in the rear-looking image.

Based on the image information collected by the front-looking camera apparatus, the front-looking road edge is detected based on a road structure model by using a method such as image detection or deep learning, and corresponding road edge information is obtained. The road edge may be represented by using a curve of a specific road structure model. Different road edge representations may include a horizontal offset of a road edge, a heading angle of the road edge, average curvature of a road, and an average curvature change rate of the road. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the front-looking road edge may be represented as follows:

$$X_{front,edge} = C3_{front,edge} \times Z^3 + C2_{front,edge} \times Z^2 + C1_{front,edge} \times Z + C0_{front,edge}$$

In this embodiment of this application, $C0_{front,\,edge}$ is a horizontal offset of a road edge related to the front-looking road edge, $C1_{front\,edge}$ is a heading angle of the road edge related to the front-looking road edge, $C1_{front,\,edge}$ is twice average curvature of the road edge related to the front-looking road edge, $C1_{front,\,edge}$ is six times an average curvature change rate of the road edge related to the front-looking road edge, $X_{front,\,edge}$ is a horizontal offset of the vehicle, and Z is a longitudinal offset of the vehicle.

In addition, the probability that the front-looking road edge exists may be further obtained through detection, and is represented as $P_{front,\,edge}$. The probability that the front-looking road edge exists is used to indicate a probability that the road edge exists in the front-looking image.

Based on the image information collected by the front-looking camera apparatus, a front-looking observed vehicle is detected based on a road structure model by using a method such as image detection or deep learning, and corresponding vehicle track information is obtained. A vehicle track may be represented by using a curve of a specific road structure model. Different vehicle track representations may include a horizontal offset of a road edge, a heading angle of the road edge, average curvature of a road, and an average curvature change rate of the road. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. A correspondence between a horizontal offset and a longitudinal offset of a vehicle track of an $i^{th}$ observed vehicle in vehicle tracks collected by the front-looking camera apparatus in the traveling process of the vehicle may be represented as follows:

$$X_{front,car(i)} = C3_{front,car(i)} \times Z^3 + C2_{front,car(i)} \times Z^2 + C1_{front,car(i)} \times Z + C0_{front,car(i)}$$

In this embodiment of this application, $C0_{front,\,car(i)}$ is a horizontal offset of a road edge related to the vehicle track of the $i^{th}$ observed vehicle, $C1_{front,\,car(i)}$ is a heading angle of the road edge related to the vehicle track of the $i^{th}$ observed vehicle, $C2_{front,\,car(i)}$ is twice average curvature of the road edge related to the vehicle track of the $i^{th}$ observed vehicle, $C3_{front,\,car(i)}$ is six times an average curvature change rate of the road edge related to the vehicle track of the $i^{th}$ observed vehicle, X is a horizontal offset of the vehicle, and Z is a longitudinal offset of the vehicle.

A probability that the vehicle track of the $i^{th}$ observed vehicle exists may be represented as $P_{front,\,car(i)}$.

In an optional design, vehicle track information of each observed vehicle may be processed to obtain the front-looking vehicle track information, and a correspondence between a horizontal offset and a longitudinal offset of a front-looking vehicle track in the traveling process of the vehicle may be represented as follows:

$$X_{front,car} = C3_{front,car} \times Z^3 + C2_{front,car} \times Z^2 + C1_{front,car} \times Z + C0_{front,car}$$

In this embodiment of this application, in parameters of the correspondence between the horizontal offset and the longitudinal offset of the front-looking vehicle track, $C0_{front,\,car}$ is a horizontal offset of a road edge related to a vehicle track of an observed vehicle, $C1_{front,\,car}$ is a heading angle of the road edge related to the vehicle track of the observed vehicle, $C2_{front,\,car}$ is twice average curvature of the road edge related to the vehicle track of the observed vehicle, $C3_{front,\,car}$ is six times an average curvature change rate of the road edge related to the vehicle track of the observed vehicle, $X_{front,\,car}$ is a horizontal offset of the vehicle, and Z is a longitudinal offset of the vehicle.

An implementation may be as follows: Vehicle track information corresponding to an observed vehicle with a highest existence probability of a vehicle track is selected as the front-looking vehicle track information, or vehicle track information of all observed vehicles may be weighted and averaged to obtain the front-looking vehicle track information. This is not limited herein.

A probability that the front-looking vehicle track exists may be represented as $P_{front,\,car}$, and the probability that the front-looking vehicle track exists is used to indicate a probability that the vehicle track exists in the front-looking image.

Based on the image information collected by the rear-looking camera apparatus, the rear-looking road edge is detected based on a road structure model by using a method such as image detection or deep learning, and corresponding lane edge information is obtained. The road edge may be represented by using a curve of a specific road structure model and a correspondence between a horizontal offset and a longitudinal offset. Different road edge representations may include a horizontal offset of a road edge, a heading angle of the road edge, average curvature of a road, and an average curvature change rate of the road. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained.

In the traveling process of the vehicle, the correspondence between the horizontal offset and the longitudinal offset of the rear-looking road edge may be represented as follows:

$$X_{rear,edge} = C3_{rear,edge} \times Z^3 + C2_{rear,edge} \times Z^2 + C1_{rear,edge} \times Z + C0_{rear,edge}.$$

In this embodiment of this application, $C0_{rear,\ edge}$ is a horizontal offset of a road edge related to the rear-looking road edge, $C1_{rear,\ edge}$ is a heading angle of the road edge related to the rear-looking road edge, $C2_{rear,\ edge}$ is twice average curvature of the road edge related to the rear-looking road edge, $C3_{rear,\ edge}$ is six times an average curvature change rate of the road edge related to the rear-looking road edge, $X_{rear,\ edge}$ is a horizontal offset of the vehicle, and Z is a longitudinal offset of the vehicle.

In addition, the probability that the rear-looking road edge exists may be further obtained through detection, and is represented as $P_{rear,\ edge}$. The probability that the rear-looking road edge exists is used to indicate a probability that the road edge exists in the rear-looking image.

Based on the radar information collected by the millimeter-wave radar, the radar information is detected based on a road structure model by using a method such as deep learning, and corresponding road edge information is obtained. A road edge may be represented by using a curve of a specific road structure model and a correspondence between a horizontal offset and a longitudinal offset. Different road edge representations may include a horizontal offset of a road edge, a heading angle of the road edge, average curvature of a road, and an average curvature change rate of the road. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. In the traveling process of the vehicle, the correspondence between the horizontal offset and the longitudinal offset of the radar road edge may be represented as follows:

$$X_{radar,edge} = C3_{radar,edge} \times Z^3 + C2_{radar,edge} \times Z^2 + C1_{radar,edge} \times Z + C0_{radar,edge}.$$

In this embodiment of this application, $C0_{radar,\ edge}$ is a horizontal offset of a road edge obtained based on the radar road edge information, $C1_{radar,\ edge}$ is a heading angle of the road edge obtained based on the radar road edge information, $C2_{radar,\ edge}$ is twice average curvature of the road edge obtained based on the radar road edge information, $C3_{radar,\ edge}$ is six times an average curvature change rate of the road edge obtained based on the radar road edge information, $X_{radar,\ edge}$ is a horizontal offset of the vehicle, and Z is a longitudinal offset of the vehicle.

In addition, the probability that the radar road edge exists may be further obtained through detection, and is represented as $P_{radar,\ lane}$. The probability that the radar road edge exists is used to indicate a probability that a road edge detected by the millimeter-wave radar exists.

Based on the radar information collected by the millimeter-wave radar, collected track information of one or more observed vehicles may be analyzed based on a road structure model by using a method such as depth learning, and may be represented by using a curve of a specific road structure model and a correspondence between a horizontal offset and a longitudinal offset. Different vehicle track representations may include a horizontal offset of a road edge, a heading angle of the road edge, average curvature of a road, and an average curvature change rate of the road. An optional formula representation method for the road structure model is provided below. However, this application is not limited thereto, and the road structure model may be determined or indicated by at least one of the foregoing parameters.

In an optional design, road curve information detected in the traveling process of the vehicle is fused, so that a road curve obtained after fusion, that is, a correspondence between a horizontal offset and a longitudinal offset in the traveling process of the vehicle may be obtained. A correspondence between a horizontal offset and a longitudinal offset of a vehicle track of an $i^{th}$ observed vehicle in vehicle tracks collected by the millimeter-wave radar in the traveling process of the vehicle may be represented as follows:

$$X_{radar,car(i)} = C3_{radar,car(i)} \times Z^3 + C2_{radar,car(i)} \times Z^2 + C1_{radar,car(i)} \times Z + C0_{radar,car(i)}.$$

In this embodiment of this application, $C0_{radar,\ car(i)}$ is a horizontal offset of a road edge related to the vehicle track of the $i^{th}$ observed vehicle, $C1_{radar,\ car(i)}$ is a heading angle of the road edge related to the vehicle track of the $i^{th}$ observed vehicle, $C2_{radar,\ car(i)}$ is twice average curvature of the road edge related to the vehicle track of the $i^{th}$ observed vehicle, $C3_{radar,\ car(i)}$ is six times an average curvature change rate of the road edge related to the vehicle track of the $i^{th}$ observed vehicle, X is a horizontal offset of the vehicle, and Z is a longitudinal offset of the vehicle.

A probability that a vehicle track of a target vehicle exists may be represented as $P_{radar,\ car(i)}$.

In an optional design, vehicle track information of each target vehicle may be processed to obtain the radar vehicle track information, and a correspondence between a horizontal offset and a longitudinal offset of a radar vehicle track may be represented as follows:

$$X_{radar,car} = C3_{radar,car} \times Z^3 + C2_{radar,car} \times Z^2 + C1_{radar,car} \times Z + C0_{radar,car}.$$

In this embodiment of this application, in parameters of the correspondence between the horizontal offset and the longitudinal offset of the radar vehicle track, $C0_{radar,car}$ is a horizontal offset of a road edge related to a vehicle track of an observed vehicle, $C1_{radar,car}$ is a heading angle of the road edge related to the vehicle track of the observed vehicle, $C2_{radar,car}$ is twice average curvature of the road edge related to the vehicle track of the observed vehicle, $C3_{radar,car}$ is six times an average curvature change rate of the road edge related to the vehicle track of the observed vehicle, $X_{radar,car}$ is a horizontal offset of the vehicle, and Z is a longitudinal offset of the vehicle.

An implementation may be as follows. Radar vehicle track information corresponding to an observed vehicle with a highest existence probability of a vehicle track is selected as radar vehicle track information of a to-be-observed vehicle, or vehicle track information of all observed vehicles may be weighted and averaged to obtain the radar vehicle track information. This is not limited herein.

A probability that the radar vehicle track exists may be represented as $P_{radar,\ car}$, and the probability that the radar vehicle track exists is used to indicate a probability that a vehicle track detected by the millimeter-wave radar exists.

In this embodiment, the foregoing correspondence between a horizontal offset and a longitudinal offset in the traveling process of the vehicle is merely used as an example for description. It may be understood that in actual application, a correspondence may have another form, for example, an equivalent variant of the foregoing correspondence between a horizontal offset and a longitudinal offset in the traveling process of the vehicle. This is not limited herein.

In this embodiment, the road information detection apparatus may fuse the front-looking lane line information, the rear-looking lane line information, the front-looking lane structure information, the rear-looking lane structure information, and the radar lane structure information by using at least one of a plurality of fusion algorithms, to obtain the target lane line information. The fusion algorithm may be a Bayesian fusion algorithm, or may be another fusion algorithm such as a multi-hypothesis check algorithm. In this embodiment, a probability-based fusion algorithm is used as an example for a description.

In an optional design, a correspondence of a target lane line obtained after fusion may be represented as follows:

$$X_{fusion}=C3_{fusion} \times Z^3 + C2_{fusion} \times Z^2 + C1_{fusion} \times Z + C0_{fusion}.$$

A probability that a lane line exists is $P_{fusion}$, X is a horizontal offset of the vehicle, and Z is a longitudinal offset of the vehicle.

In this embodiment of this application, $C0_{fusion}$ is a horizontal offset of a road edge of the lane line obtained after fusion, $C1_{fusion}$ is a heading angle of the road edge of the lane line obtained after fusion, $C2_{fusion}$ is twice average curvature of the road edge of the lane line obtained after fusion, and $C3_{fusion}$ is six times an average curvature change rate of the road edge of the lane line obtained after fusion.

The road information detection apparatus obtains $(C3_{fusion}, C2_{fusion}, C1_{fusion}, C0_{fusion})$, $P_{fusion}$ based on
$(C3_{front, lane}, C2_{front, lane}, C1_{front, lane}, C0_{front, lane})$, $P_{front, lane}$; $(C3_{rear, lane}, C2_{rear, lane}, C1_{rear, lane}, C0_{rear, lane})$, $P_{rear, lane}$; $(C3_{front, edge}, C2_{front, edge}, C1_{front, edge}, C0_{front, edge})$, $P_{front, edge}$; $(C3_{front, car}, C2_{front, car}, C1_{front, car}, C0_{front, car})$, $P_{front, car}$; $(C3_{rear, edge}, C2_{rear, edge}, C1_{rear, edge}, C0_{rear, edge})$, $P_{rear, edge}$; $(C3_{radar, car}, C2_{radar, car}, C1_{radar, car}, C0_{radar, car})$, $P_{radar, car}$; and $(C3_{radar, edge}, C2_{radar, edge}, C1_{radar, edge}, C0_{radar, edge})$, $P_{radar, edge}$.

In an optional manner, an example specific manner is as follows.

A threshold may be first set. If a probability of road information collected by a specific collector is less than the threshold, the road information is considered as untrusted. For example, if $P_{front, lane}$ is less than the threshold, $C3_{front, lane}$, $C2_{front, lane}$, $C1_{front, lane}$, and $C0_{front, lane}$ are considered as untrusted, and only road information greater than or equal to the threshold is considered as trusted. For example, the threshold herein may be set to 0.5. It may be understood that the threshold may be another value such as 0.6, and this is not limited herein.

In this embodiment of this application, all probabilities may be compared with a same threshold, or different thresholds may be used. For example, the probability $P_{front, lane}$ that the front-looking lane line information exists is compared with a first threshold, and the probability $P_{rear, lane}$ that the rear-looking lane line information exists is compared with a second threshold. The first threshold and the second threshold are unequal. For example, the first threshold is 0.6, and the second threshold is 0.7.

If probabilities of all collected road information are less than the specified threshold, it indicates that the road information collected this time is invalid.

If a probability of only one piece of collected road information is greater than or equal to the threshold, it indicates that road information corresponding to a probability higher than the threshold is trusted, and other road information is untrusted. In this case, the trusted road information is directly used.

Detection information greater than or equal to the threshold in all the foregoing road detection information is selected, and the following example method is used.

$P_{fusion}=n/(1/P_{front, lane}+1/P_{rear, lane}+1/P_{front, edge}+1/P_{front, car}+1/P_{rear, edge}+1/P_{radar, car}+1/P_{radar, edge})$, where n=7.

Then, this correspondence is solved.
$X_{fusion}/P_{fusion}=X_{front, lane}/P_{front, lane}+X_{rear, lane}/P_{rear, lane}+X_{front, edge}/P_{front, edge}+X_{front, car}/P_{front, car}+X_{rear, edge}/P_{rear, edge}+X_{radar, car}/P_{radar, car}+X_{radar, edge}/P_{radar, edge}.$ $X_{fusion}$ is a horizontal offset obtained after fusion.

The following is obtained:
$Ci_{fusion}$, where i is an integer from 0 to 3.

It may be understood that the threshold may not be set in actual application. For example, the road information detection apparatus determines that all parameters are valid parameters.

610: The road information detection apparatus outputs the target lane line information.

That the road information detection apparatus outputs the target lane line information includes: The road information detection apparatus outputs the correspondence, obtained in step 609, between the horizontal offset and the longitudinal offset of the target lane line in the traveling process of the vehicle. An output manner may be an image, a video, voice, or text. An output manner is not limited herein.

The foregoing describes the information transmission method in embodiments of this application, and the following describes a device in embodiments of this application. A road information detection apparatus may be deployed on the road information detection apparatus in a form of software.

Figure 7:
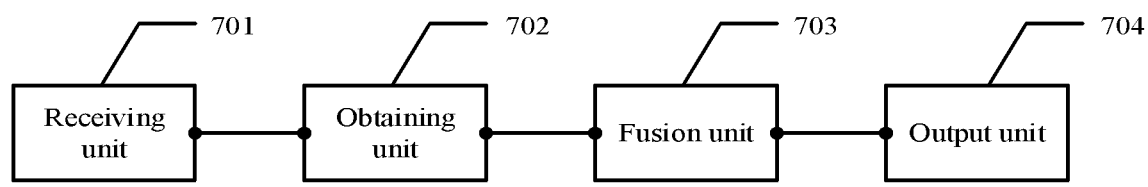
FIG. 7 is a schematic diagram of a structure of a road information detection apparatus according to an embodiment of this application.

Refer to FIG. 7, an embodiment of a road information detection apparatus in embodiments of this application includes a receiving unit 701, an obtaining unit 702, a fusion unit 703, and an output unit 704.

The receiving unit 701 is configured to receive a front-looking image from at least one front-looking camera apparatus and a rear-looking image from at least one rear-looking camera apparatus, and is further configured to receive radar data.

The obtaining unit 702 is configured to obtain front-looking lane line information based on the front-looking image, obtain rear-looking lane line information based on the rear-looking image, is further configured to obtain front-looking lane structure information based on the front-looking image, obtain rear-looking lane structure information based on the rear-looking image, and is further configured to obtain radar lane structure information based on the radar data.

The fusion unit 703 is configured to obtain target lane line information based on the front-looking lane line information and the rear-looking lane line information.

The fusion unit 703 may be configured to obtain the target lane line information in any one or more of the following manners.

(1) fusing a correspondence between a horizontal offset and a longitudinal offset of a front-looking lane line, a probability that the front-looking lane line exists, a correspondence between a horizontal offset and a longitudinal offset of a rear-looking lane line, and a probability that the rear-looking lane line exists, to obtain a correspondence between a horizontal offset and a longitudinal offset of a target lane line;

(2) fusing the front-looking lane line information, the rear-looking lane line information, the front-looking lane structure information, and the rear-looking lane structure information, to obtain the target lane line information;

(3) fusing the correspondence between a horizontal offset and a longitudinal offset of a front-looking lane line, the probability that the front-looking lane line exists, the correspondence between a horizontal offset and a longitudinal offset of a rear-looking lane line, the probability that the rear-looking lane line exists, a correspondence between a horizontal offset and a longitudinal offset of a front-looking lane structure, a probability that the front-looking lane structure exists, a correspondence between a horizontal offset and a longitudinal offset of a rear-looking lane structure, and a probability that the rear-looking lane structure exists, to obtain the correspondence between a horizontal offset and a longitudinal offset of a target lane line;

(4) fusing the front-looking lane line information, the rear-looking lane line information, and the radar lane structure information, to obtain the target lane line information;

(5) fusing the correspondence between a horizontal offset and a longitudinal offset of a front-looking lane line, the probability that the front-looking lane line exists, the correspondence between a horizontal offset and a longitudinal offset of a rear-looking lane line, the probability that the rear-looking lane line exists, a correspondence between a horizontal offset and a longitudinal offset of a radar lane structure, and a probability that the radar lane structure exists, to obtain the correspondence between a horizontal offset and a longitudinal offset of a target lane line;

(6) fusing the front-looking lane line information, the rear-looking lane line information, the front-looking lane structure information, the rear-looking lane structure information, and the radar lane structure information, to obtain the target lane line information; and (7) fusing the correspondence between a horizontal offset and a longitudinal offset of a front-looking lane line, the probability that the front-looking lane line exists, the correspondence between a horizontal offset and a longitudinal offset of a rear-looking lane line, the probability that the rear-looking lane line exists, the correspondence between a horizontal offset and a longitudinal offset of a front-looking lane structure, the probability that the front-looking lane structure exists, the correspondence between a horizontal offset and a longitudinal offset of a rear-looking lane structure, and the probability that the rear-looking lane structure exists, the correspondence between a horizontal offset and a longitudinal offset of a radar lane structure, and the probability that the radar lane structure exists, to obtain the correspondence between a horizontal offset and a longitudinal offset of a target lane line.

The output unit 704 is configured to output the target lane line information.

In this embodiment, an operation performed by each unit of the road information detection apparatus is similar to those described in embodiments shown in FIG. 3 to FIG. 6. Details are not described herein again.

Figure 8:
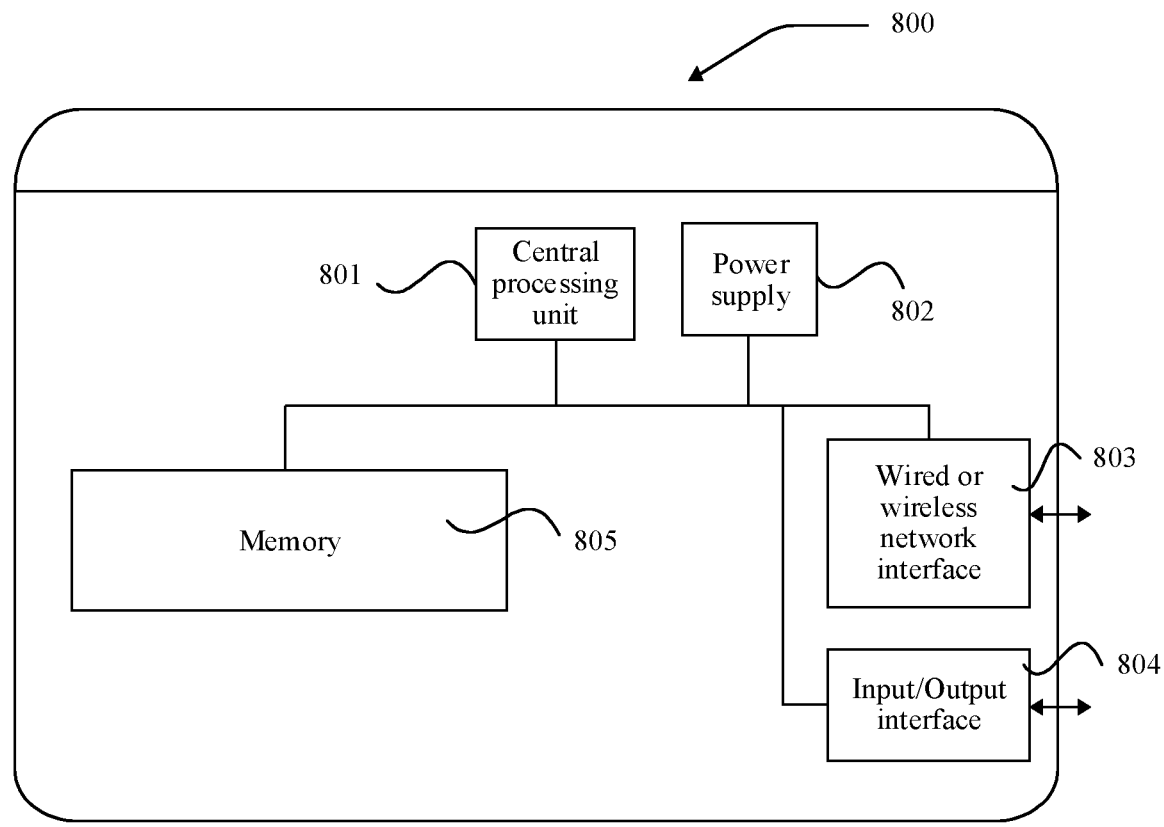
FIG. 8 is a schematic diagram of another structure of a road information detection apparatus according to an embodiment of this application.

FIG. 8 is another schematic diagram of a structure of a road information detection apparatus according to an embodiment of this application. The road information detection apparatus 800 may include one or more processors 801 and a memory 805, and the memory 805 stores one or more application programs or data.

The memory 805 may be a volatile memory or a persistent memory. The program stored in the memory 805 may include one or more modules, and each module may include a series of instruction operations for the road information detection apparatus. Further, the processor 801 may be configured to communicate with the memory 805, and perform, on the road information detection apparatus 800, the series of instruction operations in the memory 805.

Further, optionally, the road information detection apparatus 800 may further include one or more power supplies 802, one or more wired or wireless network interfaces 803, one or more input/output interfaces 804, and/or one or more operating systems such as Windows Server®, Mac OS X®, Unix®, Linux®, and FreeBSD®.

The processor 801 may perform operations performed by the road information detection apparatuses in embodiments shown in FIG. 3 to FIG. 6. Details are not described herein again.

An embodiment of this application provides a vehicle. The vehicle includes at least one detection apparatus, for example, the road information detection apparatus 800 shown in FIG. 8. The vehicle may perform operations performed by the road information detection apparatuses in embodiments shown in FIG. 3 to FIG. 6.

An embodiment of this application provides a detection system. The detection system includes a detection apparatus and at least one sensor. The detection apparatus may be the road information detection apparatus 800 shown in FIG. 8, and the sensor may include at least one of a camera apparatus, a millimeter-wave radar, and/or the like.

This application provides a chip system. The chip system includes a processor configured to support a road information detection apparatus in implementing functions in the foregoing aspects, for example, sending or processing data and/or information in the foregoing methods. In a possible design, the chip system further includes a memory. The memory is configured to store necessary program instructions and data. The chip system may include a chip, or may include a chip and another discrete device.

In another possible design, when the chip system is a chip in the road information detection apparatus and the like, the chip includes a processing unit and a communication unit. The processing unit may be, for example, a processor. The communication unit may be, for example, an input/output interface, a pin, or a circuit. The processing unit may execute computer-executable instructions stored in a storage unit, so that the chip in the road information detection apparatus performs the steps of the method performed by the road information detection apparatus in any embodiment in FIG. 3 to FIG. 6. Optionally, the storage unit is a storage unit in the chip, for example, a register or a cache. The storage unit may alternatively be a storage unit that is in UE, a base station, and the like and that is located outside the chip, for example, a read-only memory (ROM), another type of static storage device capable of storing static information and instructions, or a random-access memory (RAM).

An embodiment of this application further provides a computer-readable storage medium, and the computer-readable storage medium stores a computer program. When the computer program is executed by a computer, a method procedure related to the road information detection apparatus in any one of the foregoing method embodiments is implemented. Correspondingly, the computer may be the foregoing road information detection apparatus.

It should be understood that the processor in the road information detection apparatus, the chip system, or the like in the foregoing embodiments of this application, or the processor provided in the foregoing embodiments of this application may be a central processing unit (CPU), or may be another general-purpose processor, a digital signal processor (DSP), an application-specific integrated circuit (ASIC), a field-programmable gate array (FPGA), another programmable logic device, a discrete gate or a transistor logic device, a discrete hardware component, or the like. The general-purpose processor may be a microprocessor, or the processor may be any conventional processor or the like.

It should be further understood that there may be one or more processors in the road information detection apparatus, the chip system, or the like in the foregoing embodiments of this application. The quantity may be adjusted based on an actual application scenario. This is merely an example for description herein, and is not limited. There may be one or more memories in embodiments of this application. This may be adjusted based on an actual application scenario. This is merely an example for description herein, and is not limited.

It should be further understood that in embodiments of this application, the memory, the readable storage medium, or the like in the road information detection apparatus, the chip system, or the like in the foregoing embodiments may be a volatile memory or a non-volatile memory, or may include both a volatile memory and a non-volatile memory. The non-volatile memory may be a ROM, a programmable read-only memory (PROM), an erasable programmable read-only memory (EPROM), an electrically-erasable programmable read-only memory (EEPROM), or a flash memory. The volatile memory may be a RAM, and is used as an external cache. Through example but not limitative descriptions, many forms of RAMs are available, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a SynchLink dynamic random-access memory (SLDRAM), and a direct Rambus random-access memory (DR RAM).

It should be further noted that when the road information detection apparatus includes a processor (or a processing unit) and a memory, the processor in this application may be integrated with the memory, or may be connected to the memory through an interface. This may be adjusted based on an actual application scenario, and is not limited.

An embodiment of this application further provides a computer program or a computer program product including the computer program. When the computer program is executed on a computer, the computer is enabled to implement a method procedure related to any one of the foregoing method embodiments. Correspondingly, the computer may be the foregoing road information detection apparatus.

All or some of the foregoing embodiments in FIG. 3 to FIG. 6 may be implemented by using software, hardware, firmware, or any combination thereof. When software is used to implement embodiments, all or some of embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a Digital Video Disk (DVD)), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions to enable a computer device (which may be a personal computer, a server, a network device, or the like) to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

What is claimed is:
1. A road information detection method, comprising:
  receiving a front-looking image from at least one front-looking camera apparatus;

receiving a rear-looking image from at least one rear-looking camera apparatus;
obtaining front-looking lane line information based on the front-looking image, wherein the front-looking lane line information comprises a first correspondence of a front-looking lane line and a first probability that the front-looking lane line exists;
obtaining rear-looking lane line information based on the rear-looking image, wherein the rear-looking lane line information comprises a second correspondence of a rear-looking lane line and a second probability that the rear-looking lane line exists; and
obtaining target lane line information based on:
fusing the first correspondence, the first probability, the second correspondence, and the second probability; and
obtaining a correspondence of a target lane line in response to the fusing.

2. The road information detection method of claim 1, further comprising:
obtaining front-looking lane structure information based on the front-looking image, and
obtaining rear-looking lane structure information based on the rear-looking image,
wherein obtaining the target lane line information comprises fusing the front-looking lane line information, the rear-looking lane line information, the front-looking lane structure information, and the rear-looking lane structure information.

3. The road information detection method of claim 2, wherein the front-looking lane line information comprises a first correspondence of a front-looking lane line and a first probability that the front-looking lane line exists, wherein the rear-looking lane line information comprises a second correspondence of a rear-looking lane line and a second probability that the rear-looking lane line exists, wherein the front-looking lane structure information comprises a third correspondence of a front-looking lane structure and a third probability that the front-looking lane structure exists, wherein the rear-looking lane structure information comprises a fourth correspondence of a rear-looking lane structure and a fourth probability that the rear-looking lane structure exists, and wherein the road information detection method further comprises further fusing the first correspondence, the first probability, the fourth correspondence, the second probability, the second correspondence, the third probability, the fourth correspondence, and the fourth probability to obtain a correspondence of a target lane line.

4. The road information detection method of claim 3, wherein the front-looking lane structure information comprises at least one of front-looking road edge information or front-looking vehicle track information, wherein the third correspondence comprises a fifth correspondence of at least one of a front-looking road edge or an sixth correspondence of a front-looking vehicle track, wherein the third probability comprises a seventh probability that at least one of the front-looking road edge exists or an eighth probability that the front-looking vehicle track exists, wherein the rear-looking lane structure information comprises rear-looking road edge information, wherein the fourth correspondence comprises a ninth correspondence of a rear-looking road edge, and wherein the fourth probability that the rear-looking lane structure exists comprises a tenth probability that the rear-looking road edge exists.

5. The road information detection method of claim 1, further comprising:

receiving radar data from at least one radar; and
obtaining radar lane structure information based on the radar data,
wherein obtaining the target lane line information further comprises fusing the front-looking lane line information, the rear-looking lane line information, and the radar lane structure information.

6. The road information detection method of claim 5, wherein the radar lane structure information comprises a third correspondence of a radar lane structure and a third probability that the radar lane structure exists, and wherein fusing the front-looking lane line information, the rear-looking lane line information, and the radar lane structure information further comprises further fusing the first correspondence, the first probability, the second correspondence, the second probability, the third correspondence, and the third probability, to obtain a correspondence of a target lane line.

7. The road information detection method of claim 6, wherein the radar lane structure information comprises at least one of radar road edge information or radar vehicle track information, wherein the third correspondence comprises a fourth correspondence of at least one of a radar road edge or a fifth correspondence of a radar vehicle track, and wherein the third probability that the radar lane structure exists comprises at least one of a fourth probability that the radar road edge exists or a fifth probability that the radar vehicle track exists.

8. The road information detection method of claim 1, further comprising:
obtaining front-looking lane structure information based on the front-looking image;
obtaining rear-looking lane structure information based on the rear-looking image;
receiving radar data from at least one radar;
obtaining radar lane structure information based on the radar data; and
the obtaining further comprises fusing the front-looking lane line information, the rear-looking lane line information, the front-looking lane structure information, the rear-looking lane structure information, and the radar lane structure information.

9. The road information detection method of claim 8, wherein the front-looking lane structure information comprises a third correspondence of a front-looking lane structure and a third probability that the front-looking lane structure exists, wherein the rear-looking lane structure information comprises a fourth correspondence of a rear-looking lane structure and a fourth probability that the rear-looking lane structure exists, wherein the radar lane structure information comprises a fifth correspondence of a radar lane structure and a fifth probability that the radar lane structure exists, and wherein the road information detection method further comprises further fusing the first correspondence, the first probability that the front-looking lane line exists, the second correspondence, the second probability, the third correspondence, the third probability, the fourth correspondence, the fourth probability, the fifth correspondence, and the fifth probability, to obtain a correspondence of a target lane line.

10. The road information detection method of claim 1, wherein the first correspondence comprises a horizontal offset that corresponds to a longitudinal offset.

11. A road information detection apparatus, comprising:
at least one processor, and
a non-transitory storage medium in communication with the at least one processor and configured to store program instructions that when executed by the processor cause the road information detection apparatus to be configured to:
  receive a front-looking image from at least one front-looking camera apparatus;
  receive a rear-looking image from at least one rear-looking camera apparatus;
  obtain front-looking lane line information based on the front-looking image, wherein the front-looking lane line information comprises a first correspondence of a front-looking lane line and a first probability that the front-looking lane line exists;
  obtain rear-looking lane line information based on the rear-looking image, wherein the rear-looking lane line information comprises a second correspondence of a rear-looking lane line and a second probability that the rear-looking lane line exists; and
  obtain target lane line information based on:
    fusing the first correspondence, the first probability, the second correspondence, and the second probability; and
    obtaining a correspondence of a target lane line in response to the fusing.

12. The road information detection apparatus of claim 11, wherein the program instructions further cause the road information detection apparatus to be configured to:
  obtain front-looking lane structure information based on the front-looking image;
  obtain rear-looking lane structure information based on the rear-looking image; and
  fuse the front-looking lane line information, the rear-looking lane line information, the front-looking lane structure information, and the rear-looking lane structure information, to obtain the target lane line information.

13. The road information detection apparatus of claim 12, wherein the front-looking lane structure information comprises a third correspondence of a front-looking lane structure and a third probability that the front-looking lane structure exists, wherein the rear-looking lane structure information comprises a fourth correspondence of a rear-looking lane structure and a fourth probability that the rear-looking lane structure exists, and wherein the program instructions further cause the road information detection apparatus to be configured to further fuse the first correspondence, the first probability, the second correspondence, the second probability, the third correspondence, the third probability, the fourth correspondence of the rear-looking lane structure, and the fourth probability that the rear-looking lane structure exists, to obtain a correspondence of a target lane line.

14. The road information detection apparatus of claim 11, wherein the program instructions further cause the road information detection apparatus to be configured to:
  receive radar data;
  obtain radar lane structure information based on the radar data; and
  fuse the front-looking lane line information, the rear-looking lane line information, and the radar lane structure information to obtain the target lane line information.

15. The road information detection apparatus of claim 14, wherein the radar lane structure information comprises a third correspondence of a radar lane structure and a third probability that the radar lane structure exists, and wherein the program instructions further cause the road information detection apparatus to further fuse the first correspondence, the first probability, the second correspondence, the second probability, the third correspondence, and the third probability to obtain a correspondence of a target lane line.

16. The road information detection apparatus of claim 11, wherein the program instructions further cause the road information detection apparatus to:
  obtain front-looking lane structure information based on the front-looking image;
  obtain rear-looking lane structure information based on the rear-looking image;
  receive radar data;
  obtain radar lane structure information based on the radar data; and
  fuse the front-looking lane line information, the rear-looking lane line information, the front-looking lane structure information, the rear-looking lane structure information, and the radar lane structure information to obtain the target lane line information.

17. The road information detection apparatus of claim 16, wherein the front-looking lane structure information comprises a third correspondence of a front-looking lane structure and a third probability that the front-looking lane structure exists, wherein the rear-looking lane structure information comprises a fourth correspondence of a rear-looking lane structure and a fourth probability that the rear-looking lane structure exists, wherein the radar lane structure information comprises a fifth correspondence of a radar lane structure and a fifth probability that the radar lane structure exists, and wherein the program instructions further cause the road information detection apparatus to further fuse the first correspondence, the first probability, the second correspondence, the second probability, the third correspondence, the third probability, the fourth correspondence, the fourth probability, the fifth correspondence, and the fifth probability to obtain a correspondence of a target lane line.

18. A computer program product comprising computer-executable instructions that are stored on a non-transitory computer storage medium and that when executed by a computer, cause the computer to:
  receive a front-looking image from at least one front-looking camera apparatus and a rear-looking image from at least one rear-looking camera apparatus;
  obtain front-looking lane line information based on the front-looking image, wherein the front-looking lane line information comprises a first correspondence of a front-looking lane line and a first probability that the front-looking lane line exists;
  obtain rear-looking lane line information based on the rear-looking image, wherein the rear-looking lane line information comprises a second correspondence of a rear-looking lane line and a second probability that the rear-looking lane line; and
  obtain target lane line information based on:
  fusing the first correspondence, the first probability, the second correspondence, and the second probability; and
    obtaining a correspondence of a target lane line in response to the fusing.

19. The computer program product of claim 18, wherein the computer-executable instructions that when executed by the computer, cause the computer to:
  obtain front-looking lane structure information based on the front-looking image, and
  obtain rear-looking lane structure information based on the rear-looking image, wherein obtaining the target lane line information comprises fusing the front-looking lane line information, the rear-looking lane line information, the front-looking lane structure information, and the rear-looking lane structure information.

20. The computer program product of claim 18, wherein the computer-executable instructions that when executed by the computer, cause the computer to:

receive radar data from at least one radar; and obtain radar lane structure information based on the radar data, wherein obtaining the target lane line information further comprises fusing the front-looking lane line information, the rear-looking lane line information, and the radar lane structure information.

\* \* \* \* \*